(12) United States Patent
Herr et al.

(10) Patent No.: US 10,011,008 B2
(45) Date of Patent: *Jul. 3, 2018

(54) TOOL ATTACHMENT FOR A HAND-HELD MACHINE TOOL

(71) Applicant: Robert Bosch GmbH, Stuttgart (DE)

(72) Inventors: Tobias Herr, Stuttgart (DE); Dietmar Saur, Gomaringen (DE); Gerald Fischer, Hemmingen (DE); Joerg Welke, Ettlingen-Schoellbronn (DE); Jens Blum, Filderstadt (DE); Andreas Necker, Waldenbuch (DE); Torsten Tussing, Illertissen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,557

(22) Filed: Aug. 15, 2014

(65) Prior Publication Data

US 2014/0346744 A1    Nov. 27, 2014

Related U.S. Application Data

(63) Continuation-in-part of application No. 14/074,991, filed on Nov. 8, 2013, now Pat. No. 9,579,782.

(30) Foreign Application Priority Data

Nov. 15, 2012  (DE) .......................... 10 2012 220 915
Jul. 15, 2013   (DE) .......................... 10 2013 213 814
Apr. 24, 2014   (DE) .......................... 10 2014 207 713

(51) Int. Cl.
*B23B 31/02*    (2006.01)
*B25F 3/00*     (2006.01)
(Continued)

(52) U.S. Cl.
CPC ............ *B25F 3/00* (2013.01); *B23B 31/1071* (2013.01); *B23B 31/1207* (2013.01); *B23Q 3/12* (2013.01);
(Continued)

(58) Field of Classification Search
CPC ..... B23B 45/003; B23B 2240/04; B25F 3/00; B25B 21/007; B25B 23/0035;
(Continued)

(56) References Cited

U.S. PATENT DOCUMENTS 2,198,921 A * 4/1940 Shaff ...................... B23B 45/003
                                                     279/99
2,710,549 A * 6/1955 Cogsdill ............... B23B 51/104
                                                     408/112
(Continued)

FOREIGN PATENT DOCUMENTS

DE      2227032 A1 * 12/1972 ................ B25F 3/00
DE      4116343 A1 * 11/1992 ................ B25F 3/00
(Continued)

OTHER PUBLICATIONS

Description EP2383076 (English translation) available at https://worldwide.espacenet.com/ (last visited Feb. 28, 2017).*
(Continued)

*Primary Examiner* — Ryan Rufo
(74) *Attorney, Agent, or Firm* — Norton Rose Fulbright US LLP; Gerard Messina

(57) ABSTRACT

A tool system having a hand-held machine tool including a tool holder for receiving an insert tool; and a mounting interface configured for mounting thereon: an angle attachment that includes an angle locking section for locking on the mounting interface and an angle drive unit; and an
(Continued)

eccentric attachment that includes an eccentric locking section for locking on the mounting interface and an eccentric drive unit.

20 Claims, 15 Drawing Sheets

(51) Int. Cl.
  *B23B 31/107*  (2006.01)
  *B23B 31/12*  (2006.01)
  *B23Q 3/12*  (2006.01)
  *B25D 11/10*  (2006.01)
  *B25D 11/12*  (2006.01)
  *B25D 17/00*  (2006.01)
  *B23B 45/00*  (2006.01)

(52) U.S. Cl.
  CPC ............ *B25D 11/10* (2013.01); *B25D 11/125* (2013.01); *B25D 17/00* (2013.01); *B23B 31/02* (2013.01); *B23B 45/003* (2013.01); *Y10T 279/3406* (2015.01); *Y10T 279/3412* (2015.01)

(58) Field of Classification Search
  CPC ...... B25D 17/005; B25D 17/08; B25D 11/02; Y10T 408/957; Y10T 408/953; Y10T 408/95; Y10T 408/94; Y10T 279/26; Y10T 279/3406; Y10T 279/3412; Y10T 279/3418
  USPC ............................................................ 30/500
  See application file for complete search history.

(56) References Cited

U.S. PATENT DOCUMENTS

| | | | | |
|---|---|---|---|---|
| 2,777,340 A | * | 1/1957 | Hettwer | B23Q 5/046 173/40 |
| 4,751,970 A | * | 6/1988 | Hecker | B23B 45/003 173/104 |
| 4,824,298 A | * | 4/1989 | Lippacher | B23B 31/008 173/48 |
| 5,470,180 A | * | 11/1995 | Jore | B23B 31/1071 279/14 |
| 5,511,912 A | * | 4/1996 | Ellerbrock | B23D 51/16 144/35.2 |
| 5,863,159 A | * | 1/1999 | Lasko | B23Q 5/045 279/143 |
| 6,651,348 B1 | * | 11/2003 | Steinmann | B23D 51/16 30/392 |
| 7,077,736 B2 | * | 7/2006 | Uzumcu | B23D 47/126 451/358 |
| 8,251,157 B2 | | 8/2012 | Gray et al. | |
| 2001/0005068 A1 | * | 6/2001 | Gifford | B23Q 3/12 279/75 |
| 2003/0077137 A1 | * | 4/2003 | Rohm | B23Q 3/12 408/239 R |
| 2004/0029508 A1 | * | 2/2004 | Robson | B23D 49/162 451/358 |
| 2005/0191139 A1 | * | 9/2005 | Hofbrucker | B25B 21/007 408/239 A |
| 2007/0079979 A1 | * | 4/2007 | Braun | B23B 45/003 173/29 |
| 2007/0290458 A1 | * | 12/2007 | Chuang | B25F 3/00 279/143 |
| 2008/0003070 A1 | * | 1/2008 | Hor | B25F 5/001 408/124 |
| 2008/0101100 A1 | * | 5/2008 | Griffin | B25F 5/02 363/54 |
| 2011/0197719 A1 | * | 8/2011 | Neitzell | B25B 13/481 81/177.75 |
| 2012/0024096 A1 | * | 2/2012 | Adkins | B23B 45/003 74/416 |
| 2012/0024556 A1 | * | 2/2012 | Zhu | B25F 3/00 173/218 |
| 2012/0266709 A1 | * | 10/2012 | Wang | B25B 15/001 74/417 |

FOREIGN PATENT DOCUMENTS

| | | | | |
|---|---|---|---|---|
| DE | | 10109956 A1 * | 11/2001 | ................ B25F 5/00 |
| DE | | 10125418 A1 * | 12/2002 | ................ B25F 3/00 |
| EP | | 2383076 A2 * | 11/2011 | ................ B25F 3/00 |
| GB | | 626869 A * | 7/1949 | .......... B23B 45/003 |

OTHER PUBLICATIONS

Description DE10109956 (English translation) available at https://worldwide.espacenet.com/ (last visited Feb. 28, 2017).*

* cited by examiner

TOOL ATTACHMENT FOR A HAND-HELD MACHINE TOOL

CROSS-REFERENCES TO RELATED APPLICATIONS

This application is a continuation-in-part of U.S. patent application Ser. No. 14/074,991 filed on Nov. 8, 2013, which claims priority under 35 U.S.C. § 119 to German Patent Application No. 10 2012 220 915.8 filed on Nov. 15, 2012 and German Patent Application No. 10 2013 213 814.8 filed on Jul. 15, 2013. This application also claims priority to German Patent Application No. 10 2014 207 713.3 filed on Apr. 24, 2014. The entire contents of each of which are expressly incorporated herein by reference thereto.

FIELD OF THE INVENTION

The present invention relates to a tool attachment having a drive shaft able to be driven rotationally and a locking section for locking on a mounting interface of a hand-held machine tool that has a tool holder having a receiving member for receiving an insert tool and a first locking sleeve preloaded by a first spring element in an axial direction pointing away from the hand-held machine tool.

DESCRIPTION OF THE RELATED ART

The related art describes tool attachments of this type, which are lockable by an assigned locking section on a mounting interface of a corresponding hand-held machine tool. In so doing, a drive shaft assigned to the tool attachment engages with a tool holder, assigned to the hand-held machine tool and provided with a spring-loaded locking sleeve, regardless of a specific position of the locking sleeve, in order to allow torque to be transferred from the tool holder to the drive shaft.

The related art has the disadvantage that in the case of such tool attachments, there must be a comparatively large radial and tangential play between the drive shaft and the tool holder in order, for example, to allow the drive shaft to engage with the tool holder in its locked state.

BRIEF SUMMARY OF THE INVENTION

An object of the present invention is therefore to provide a new tool attachment for locking on a hand-held machine tool, in doing which, at least a reduction of a tangential and radial play existing between a drive shaft of the tool attachment and a tool holder of the hand-held machine tool being made possible.

This objective is achieved by a tool attachment having a drive shaft able to be driven rotationally and a locking section for locking on a mounting interface of a hand-held machine tool that has a tool holder having a receiving member for receiving an insert tool and a first locking sleeve preloaded by a first spring element in an axial direction pointing away from the hand-held machine tool. An actuating element is provided which is designed, upon mounting the tool attachment on the hand-held machine tool, to shift the first locking sleeve in the direction of the hand-held machine tool against a spring force applied by the first spring element.

The present invention therefore makes it possible to provide a tool attachment where, by actuating the locking sleeve of a tool holder, assigned to the hand-held machine tool, by way of an actuating element assigned to the tool attachment, in order to mount the tool attachment, the tool holder is able to be released, thus permitting reduction of a tangential and radial play existing between a drive shaft of the tool attachment and a tool holder of the hand-held machine tool.

According to one specific embodiment, the actuating element embraces the drive shaft at least sectionally in sleeve-like fashion.

A robust and cost-effective actuating element may thus be provided.

Preferably, the drive shaft and the actuating element are formed in one piece.

Thus, an uncomplicated component may be provided for realizing the drive shaft and the actuating element, which is able to be installed quickly and easily in the tool attachment when manufacturing it.

According to one specific embodiment, the drive shaft is rotationally mounted in a base member that forms an inner hollow space and at whose outer circumference, a second locking sleeve is disposed which is displaceable axially against a spring force of a second spring element in order to release at least one locking element. The second locking sleeve is preloaded by the second spring element in an axial direction pointing away from the tool attachment, which, upon mounting the tool attachment on the hand-held machine tool, points in the direction of the hand-held machine tool.

The invention thus makes it possible to provide a safe and reliable locking section for the tool attachment.

Upon mounting the tool attachment on the hand-held machine tool, the spring forces of the first and second spring elements preferably act in mutually opposite directions.

Therefore, a tool attachment having a comparatively short overall length may be provided.

The at least one locking element preferably has at least one locking sphere engaging at least sectionally in an assigned radial opening in the base member.

Robust and cost-effective locking elements may thus be provided.

According to one specific embodiment, the actuating element is designed, in the mounted state of the tool attachment on the hand-held machine tool, to allow the first spring element to act upon the tool attachment via the first locking sleeve in the axial direction pointing away from the hand-held machine tool.

The present invention thus makes it possible to provide a tool attachment, in which the spring force of the spring element assigned to the tool holder of the hand-held machine tool is used, on one hand, for assistance in the axial centering of the tool attachment on the hand-held machine tool, and on the other hand, upon removal of the tool attachment from the hand-held machine tool.

Preferably, the drive shaft is able to be accommodated in the receiving member exclusively for transferring torque.

Therefore, axial centering as well as a tangentially and radially zero-play fixation of the tool attachment are carried out exclusively without involvement of the drive shaft.

According to one specific embodiment, the tool attachment is implemented in the manner of a drill-chuck adapter or an angle attachment.

Thus, a locking section for a tool attachment may be provided which is able to be used for a multitude of different tool attachments.

According to one specific embodiment, the locking section has at least one holding element, realized in the manner of a bayonet, for mounting and locking on the mounting interface of the hand-held machine tool in a manner protected against twisting.

Thus, in an easy manner, the tool attachment is able to be mounted and locked safely and reliably on the hand-held machine tool via a bayonet joint.

The objective named at the outset is also achieved by a tool system having a hand-held machine tool and a tool attachment for mounting on the hand-held machine tool, which is provided with a tool holder that has a receiving member for accommodating an insert tool, and a first locking sleeve preloaded by a first spring element in an axial direction pointing away from the hand-held machine tool. The tool holder is assigned a mounting interface for mounting the tool attachment, which is provided with a drive shaft, able to be driven rotationally, and a locking section for locking on the mounting interface. The tool attachment has an actuating element which is designed, upon mounting the tool attachment on the hand-held machine tool, to shift the first locking sleeve in the direction of the hand-held machine tool, against a spring force applied by the first spring element.

The present invention further relates to a tool system made up of a hand-held machine tool and a plurality of different, especially at least two, tool attachments. The hand-held machine tool is equipped with a tool holder taking the form of a bit holder, and a mounting interface which locks the tool attachments interchangeably to a fixed housing component of the hand-held machine tool. Thus, the hand-held machine tool may be used selectively with one of the tool attachments or with an insert tool in the form of a screwdriver bit. For example, the following are suitable as tool attachments: A drill-chuck attachment, an angle attachment, an eccentric attachment, a hammer-blow attachment. All tool attachments are protected against twisting and are releasably coupled axially to the mounting interface of the hand-held machine tool.

DETAILED DESCRIPTION OF THE INVENTION

Figure 1:
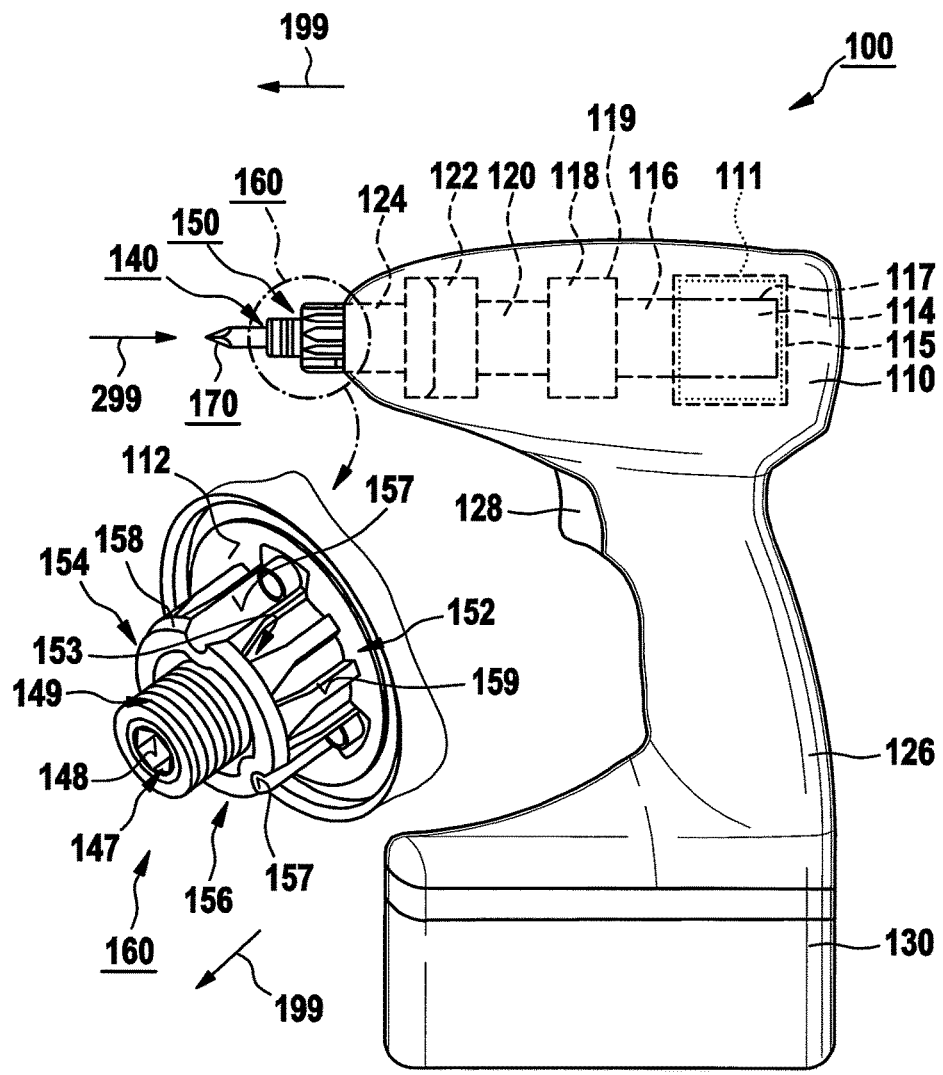
FIG. 1 shows a schematic view of a hand-held machine tool having a tool holder and a mounting interface according to one specific embodiment.

FIG. 1 shows a hand-held machine tool 100 which is provided with a tool holder 140 and has a housing 110 having a hand grip 126, as well as an enlarged section 160 of hand-held machine tool 100. According to one specific embodiment, hand-held machine tool 100 is connectable mechanically and electrically to a battery pack 130 for the cordless power supply.

By way of example, hand-held machine tool 100 is in the form of a cordless rotary-impact screwdriver. However, it is pointed out that the present invention is not limited to cordless rotary-impact screwdrivers, but rather may be used for various hand-held machine tools which have a tool holder corresponding to tool holder 140, regardless of whether the hand-held machine tool is operable electrically, i.e., in battery-powered fashion with battery pack 130 or in mains-dependent fashion, and/or non-electrically.

Disposed in housing 110 are an electric drive motor 114, supplied with current by battery pack 130, a gear unit 118 and an optional striking mechanism 122. For example, drive motor 114 is operable, that is, is able to be switched on and off, via a manual switch 128, and preferably is electronically controllable or regulable in such a way that both a reverse operation as well as setpoint selections with respect to a desired rotational speed are able to be realized.

According to one specific embodiment, drive motor 114 is an electronically commutated drive motor, preferably a direct-current motor, which, illustratively, has stator and rotor components 111 and 117, respectively. In this context, for example, stator components 111 form an outer stator and, for instance, rotor components 117 form an inner rotor. However, it is pointed out that the description of a drive motor formed in the manner of an electronically commutated drive motor with outer stator and inner rotor has merely an exemplary character, and is not to be understood as a restriction of the invention which may also be used for a drive motor having an inner stator and an outer rotor or, for example, for a commutator motor with brushgear.

Drive motor 114 is connected via an assigned motor shaft 116 to gear unit 118, which converts a rotation of motor shaft 116 into a rotation of a driving element 120, e.g., a drive shaft, provided between gear unit 118 and striking mechanism 122.

Preferably, this conversion takes place in such a way that driving element 120 rotates with increased torque relative to motor shaft 116, but reduced rotational speed. Drive motor 114 is situated illustratively in a motor housing 115 and gear unit 118 is in a gear housing 119, gear housing 119 and motor housing 115 being disposed, by way of example, in housing 110.

For example, optional striking mechanism 122, connected to driving element 120, is a rotary or rotational striking mechanism that generates impact rotary pulses with high intensity and transfers them to an output shaft 124, e.g., an output spindle. An exemplary striking mechanism with which striking mechanism 122 may be realized is described in DE 20 2006 014 850 U1, to which explicit reference is made here, and the teachings of which are to be understood as a part of the present specification, so that a detailed description of striking mechanism 122 may be omitted here in order to keep the specification brief.

Tool holder 140 is formed on output shaft 124 and, illustratively, has a receiving member 147 having inner multi-edge receiver 148 which is provided to accommodate insert tools having external multi-edge couplings. Disposed at the periphery of receiving member 147, which is joined in rotationally fixed manner to and/or is formed in one piece with output shaft 124, for instance, is a locking sleeve 149 which is acted upon by a spring element (220 in FIG. 3) in an axial direction 199 pointing away from hand-held machine tool 100, in order to lock suitable insert tools in inner multi-edge receiver 148.

For example, tool holder 140 is formed in the manner of a bit holder, i.e., for receiving an insert tool 170 taking the form of a type of screwdriver bit, which is inserted in the direction of hand-held machine tool 100, as indicated by an arrow 299, into inner multi-edge receiver 148. Such a screwdriver bit which, illustratively, is of what is known as the hex type, is sufficiently familiar from the related art, so that for the purpose of keeping the specification concise, a detailed description is omitted here. However, it is stressed that the present invention is not limited to the use of hex screwdriver bits, but rather, other insert tools, e.g., hex drill bits or what are known as SDS quick drill bits may also be used, depending on the form of tool holder 140 selected in each case. Moreover, it is pointed out that the construction and functioning method of a suitable bit holder are sufficiently familiar to one skilled in the art, so that a detailed description of bit holder 140 is omitted here in order to keep the specification brief.

According to one specific embodiment, hand-held machine tool 100 is assigned a mounting interface 150 which illustratively, is secured in axially and radially immovable manner in the area of bit holder 140 on gear housing 119 or directly on housing 110. However, it is pointed out that mounting interface 150 is formed as a separate component only by way of example, and alternatively, may also be formed in one piece with gear housing 119 or housing 110.

Mounting interface 150 is used for the mounting, especially mounting oriented in a predefined angular position, of an assigned tool attachment (200 in FIG. 2 or 500 in FIG. 5), and illustratively, has an at least sectionally sleeve-like support element 158 which has an outer circumference 159 and is secured in a manner protected against twisting at an end face 112 of housing 110 on gear housing 119 or housing 110. This support element 158, also denoted hereinafter as "mounting sleeve", jackets bit holder 140, e.g., at least sectionally, with a predefined radial clearance in order to permit an axial shift of locking sleeve 149 of bit holder 140 in the interior of mounting sleeve 158.

At outer circumference 159 of mounting sleeve 158, illustratively, a plurality of groove-like receivers 152, 154, 156, 157 are formed for receiving at least one and preferably a plurality of locking elements (232 in FIG. 2 or 5), groove-like receivers 152, 154, 156, 157 being aligned in the longitudinal direction of mounting interface 150, i.e., in direction 199 or 299. Groove-like receivers 157 are formed in such a way, for example, that they are able to receive fastening elements such as rivets or screws, for instance, for fastening mounting sleeve 158 to end face 112 of housing 110. By way of example, three groove-like receivers 152, three groove-like receivers 154 and three groove-like receivers 156, respectively, are provided, which in each case are set apart from each other by a groove-like receiver 157, so that three groove-like receivers 157 are thus also provided. However, it is pointed out that the total of twelve groove-like receivers 152, 154, 156, 157 has only an exemplary character, and is not to be understood as a restriction of the invention.

According to one specific embodiment, at least groove-like receivers 152, 154, 156 taper in axial direction 199 pointing away from hand-held machine tool 100, in order to permit axial centering of an assigned tool attachment (200 in FIG. 2 or 500 in FIG. 5) on housing 110 and/or gear housing 119 in a manner protected against twisting, as described below in connection with FIGS. 3 through 5. As illustration, each groove-like receiver 152, 154, 156 has an at least approximately V-shaped end area 153.

Figure 2:
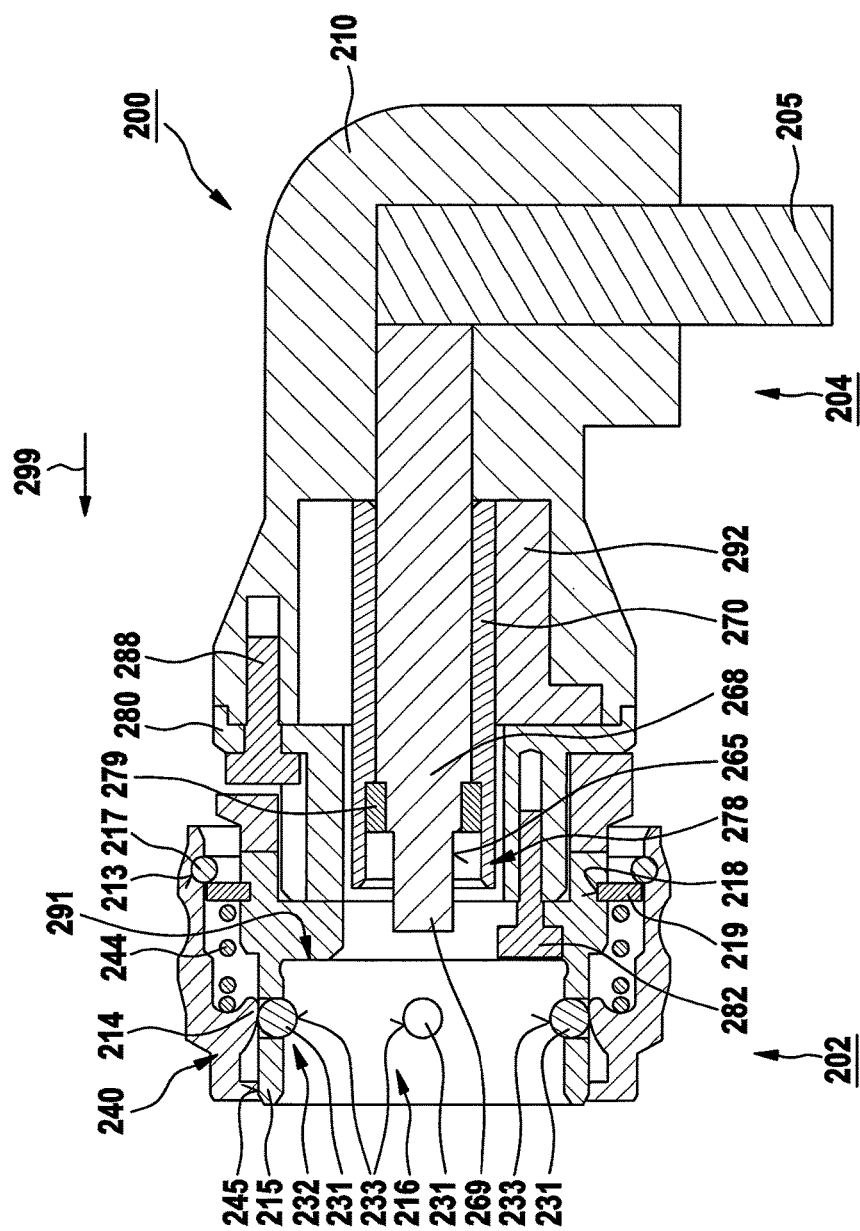
FIG. 2 shows a sectional view of a tool attachment according to a first specific embodiment.

FIG. 2 shows an exemplary tool attachment 200 which, according to one specific embodiment, is designed for mounting on mounting interface 150 of hand-held machine tool 100 of FIG. 1. According to a first specific embodiment, tool attachment 200 is implemented in the manner of an angle attachment and, for instance, has a locking section 202 as well as a drive unit 204, also denoted hereinafter as "angle drive section." However, it is stressed that tool attachment 200 is realized as an angle attachment only by way of example, and not to restrict the invention. Rather, tool attachment 200 may have any form as needed, e.g., according to a type of drill-chuck adapter as described by way of example in FIG. 5, an eccentric attachment as described illustratively in FIG. 8, or a hammer-blow attachment as described exemplarily in FIG. 9, etc. To simplify the description, tool attachment 200 is therefore also denoted hereinafter as "angle attachment 200."

For example, angle-drive section 204 has an attachment housing 210, in which a rotationally impellable drive shaft 268 of angle attachment 200 is rotationally mounted. Drive shaft 268 is used to drive an output shaft 205, which to this end is disposed at a predefined angle, illustratively 90°, that likewise is rotationally mounted in attachment housing 210 and, for example, may be designed to receive screwdriver bit 170 from FIG. 1. However, it is pointed out that a suitable implementation of angle drive section 204 is sufficiently familiar from the related art, so that a detailed description of angle drive section 204 may be omitted here in order to keep the specification concise.

In the area of a free end 269 of drive shaft 268 which faces away from angle drive section 204 and on which, for example, a multi-edge entrainment contour 265 is formed, a closure and guidance element 280 is disposed, which is sleeve-like at least in some areas and through which drive shaft 268 reaches. This closure and guidance element 280 is fastened to attachment housing 210 via suitable fastening elements 288, e.g., screws or rivets. Moreover, drive shaft 268 is assigned an actuating element 270, provided with a free end 278, which embraces drive shaft 268 at least sectionally in sleeve-like manner and whose functionality is described in detail below in connection with FIGS. 3 and 4. For example, actuating element 270 is supported in a bearing sleeve 292 provided in attachment housing 210, and is secured from slipping via free end 269 of drive shaft 268 by a retaining ring 279. Alternatively, drive shaft 268 and actuating element 270 or attachment housing 210 and actuating element 270 may also be formed in one piece.

According to one specific embodiment, drive shaft 268 is rotatable relative to actuating element 270. In this case, retaining ring 279 may be formed in the manner of a plain bearing, e.g., a sintered bearing pressed into actuating element 270.

As illustration, locking section 202 has a base member 215, which is secured to closure and guidance element 280 via assigned fastening elements 282, e.g., rivets or screws. Illustratively, base member 215 forms an inner hollow space 216 which is provided with an inner annular shoulder 291 and in which drive shaft 268 engages, and has an outer circumference 245 on which a locking sleeve 240 is disposed that is displaceable axially against a spring force of a spring element 244. This locking sleeve 240 is preloaded by spring element 244 in an axial direction pointing away from angle attachment 200, which, upon mounting angle attachment 200 on hand-held machine tool 100 of FIG. 1, points in the direction of hand-held machine tool 100 and thus corresponds to direction 299 of FIG. 1. To that end, spring element 244 is disposed between a clamping ring 214, formed by locking sleeve 240, for example, which may also be implemented as a separate component, and a retaining disk 219 situated in an annular groove 218 on base member 215. Moreover, in an inner annular groove 213 of locking sleeve 240, illustratively, an O-ring 217 is disposed at retaining disk 219 so as to be blocked in direction 299, in order to prevent locking sleeve 240 from slipping from base member 215 because of a spring force applied by spring element 244.

However, it is pointed out that the description of spring-loaded locking sleeve 240 has only an exemplary character and is not to be understood as a restriction of the invention. Alternatively, locking sleeve 240 may also be twistable, for example, so that it is possible to dispense with a spring loading.

According to one specific embodiment, locking section 202 is able to be locked via at least one and preferably a plurality of locking elements 232 on mounting interface 150 of hand-held machine tool 100 of FIG. 1, the plurality of locking elements 232 on mounting interface 150 of FIG. 1 being lockable by locking sleeve 240 in an assigned locking position. According to one specific embodiment, these locking elements 232 are designed, by interaction with mounting interface 150 of FIG. 1 in the longitudinal direction of mounting interface 150, to permit at least an axial centering that is protected against twisting, as well as an at least essentially tangentially and radially zero-play fixation of angle attachment 200 on housing 110 of hand-held machine tool 100 of FIG. 1. Preferably, the plurality of locking elements 232 have at least one locking sphere 231 engaging at least sectionally in an assigned radial opening 233 in base member 215.

Figure 3:
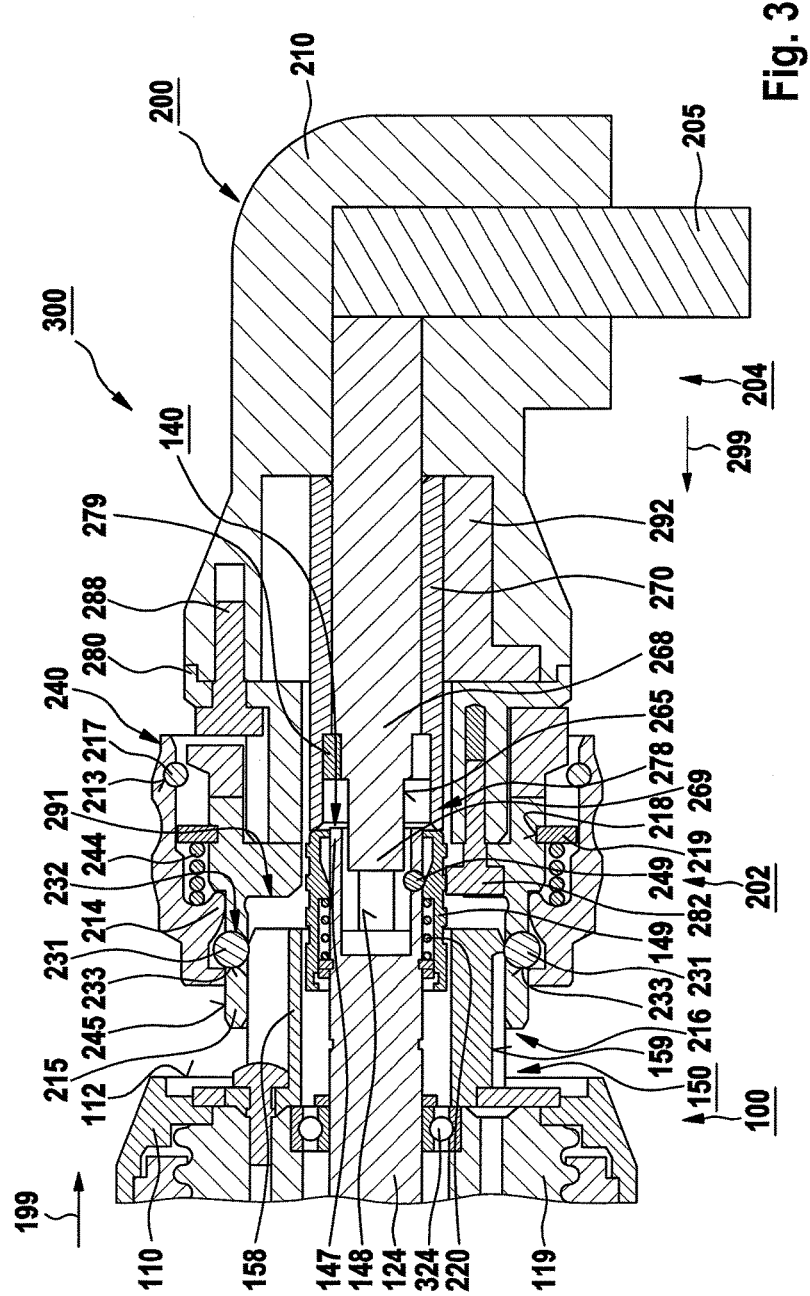
FIG. 3 shows a sectional view of a tool system according to a first specific embodiment having the hand-held machine tool of FIG. 1 and the tool attachment of FIG. 2 in the context of an exemplary mounting of the tool attachment on the hand-held machine tool.

FIG. 3 shows a first specific embodiment of a tool system 300 which, for example, has hand-held machine tool 100 of FIG. 1 and angle attachment 200 of FIG. 2, to illustrate an exemplary mounting of angle attachment 200 on hand-held machine tool 100. It is shown only sectionally here with the aid of a cut-away portion of housing 110 of FIG. 1, at whose end face 112, mounting interface 150 of FIG. 1 is disposed. Preferably, it is fastened to gear housing 119, in which output shaft 124 is rotationally mounted in an illustrative rolling-contact bearing 324, tool holder 140 of FIG. 1 being located on output shaft 124.

In order to mount angle attachment 200 on mounting interface 150 of hand-held machine tool 100, in a first step, locking sleeve 240 of angle attachment 200 is shifted from its locking position against the spring force of spring element 244 in direction 199 into its release position, so that locking spheres 231 of angle attachment 200 are released. In a further step, angle attachment 200 is then positioned on mounting interface 150 in such a way that base member 215 rests on outer circumference 159 of mounting sleeve 158 and free end 269 of drive shaft 268 of angle attachment 200 engages in inner multi-edge receiver 148 of tool holder 140, while its actuating element 270 is brought with its free end 278 to rest against locking sleeve 149 of tool holder 140 which, for example, acts radially inwards on assigned locking spheres 249, locking spheres 249 preventing an unhindered insertion of drive shaft 268 into inner multi-edge receiver 148. In this context, locking sleeve 149 is spring-loaded by a spring element 220 in axial direction 199 pointing away from hand-held machine tool 100, so that the spring forces of spring elements 244, 220 act in mutually opposite directions upon mounting angle attachment 200 on hand-held machine tool 100.

In a further step, angle attachment 200 is now pushed in the direction of hand-held machine tool 100, that is, in direction 299, onto mounting interface 150, e.g., until inner annular shoulder 291 of base member 215 comes to rest against mounting sleeve 158. Meanwhile, locking sleeve 149 of tool holder 140 is shifted by actuating element 270 of angle attachment 200 in direction 299 against a spring force applied by spring element 220, so that locking spheres 231 of angle attachment 200 are able to engage in groove-like receivers (152, 154, 156, 157 in FIG. 2), provided to receive locking spheres 231, in mounting sleeve 158, and free end 269 of drive shaft 268 is pushed into inner multi-edge receiver 148. Tool attachment 200 is thereby able to be mounted on hand-held machine tool 100 using one hand, drive shaft 268 being accommodated in inner multi-edge receiver 148 of receiving member 147 of tool holder 140 with tangential and axial play, and preferably exclusively for transferring torque.

Locking sleeve 240 of angle attachment 200, and thus entire angle attachment 200, is subsequently released, whereupon locking sleeve 240 is shifted by the spring force of spring element 244 in direction 199 back into its locking position in which locking sleeve 240 blocks or prevents the radially outwards-directed movement of locking spheres 231. At the same time, because of the spring force of spring element 220, actuating element 270 is acted upon by locking sleeve 149 of tool holder 140 in direction 199, so that an axial shift of entire angle attachment 200 in direction 199 is obtained by force. Thus, according to one specific embodiment, in the mounted state of angle attachment 200 on hand-held machine tool 100, actuating element 270 is designed to permit angle attachment 200 to be acted upon in direction 199 by spring element 220 via first locking sleeve 149.

Due to the axial shift of entire angle attachment 200 in direction 199, locking spheres 231 of angle attachment 200 are pressed into V-shaped end areas 153 of groove-like receivers (152, 154, 156, 157 in FIG. 2) of mounting sleeve 158, so that interaction of mounting sleeve 158 or mounting interface 150 with locking spheres 231 or locking elements 232 in the longitudinal direction of mounting interface 150 permits at least an axial centering protected against twisting, as well as an at least substantially tangentially and radially zero-play fixation of angle attachment 200 on housing 110 and/or gear housing 119 of hand-held machine tool 100.

Figure 4:
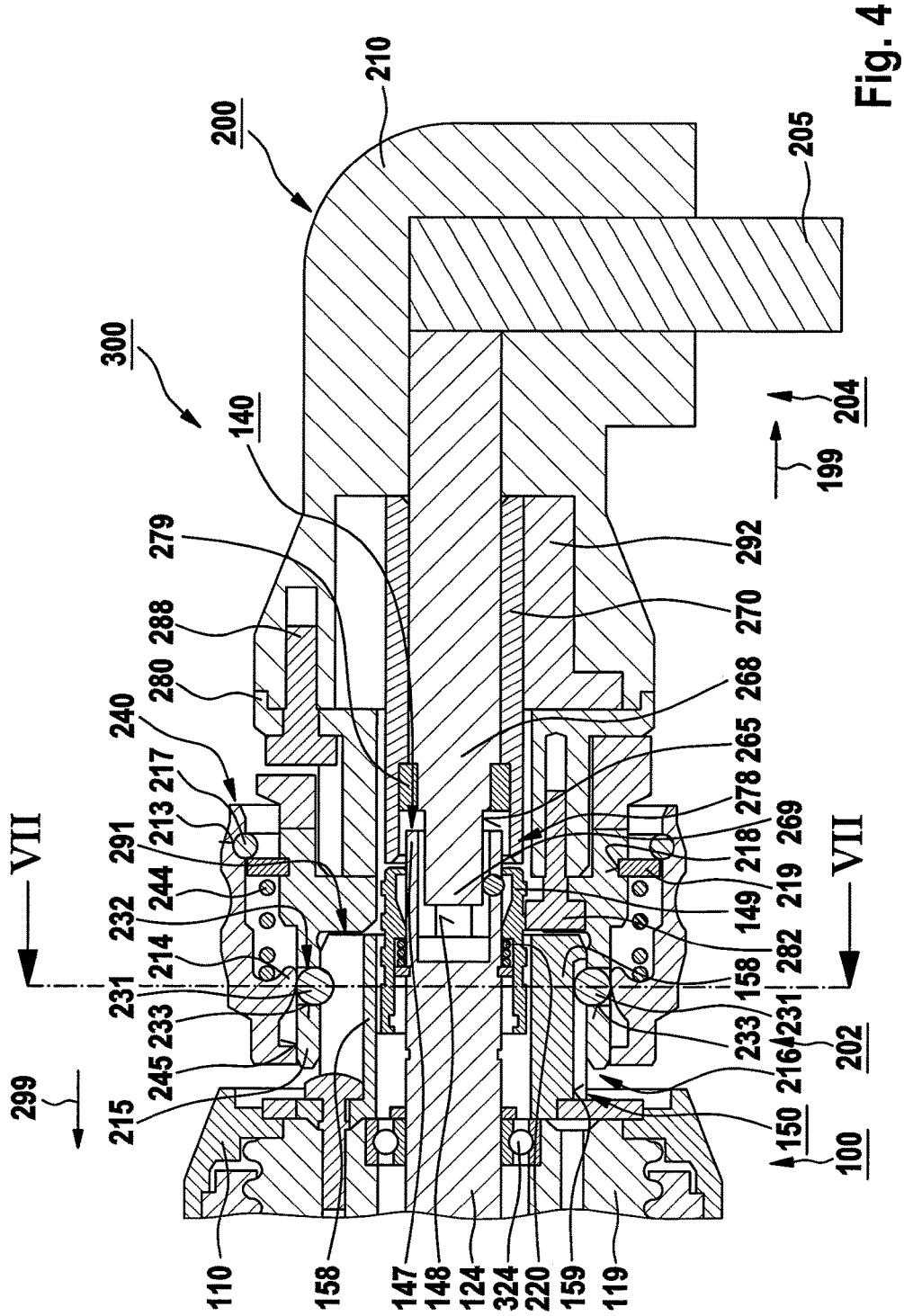
FIG. 4 shows the sectional view of the tool system of FIG. 3 having the tool attachment mounted on the hand-held machine tool.

FIG. 4 shows tool system 300 of FIG. 3 having hand-held machine tool 100 of FIG. 1 and angle attachment 200 of FIG. 2 in the assembled state. FIG. 4 clarifies the spring loading of actuating element 270 of angle attachment 200 by locking sleeve 149 of tool holder 140 of hand-held machine tool 100.

Figure 5:
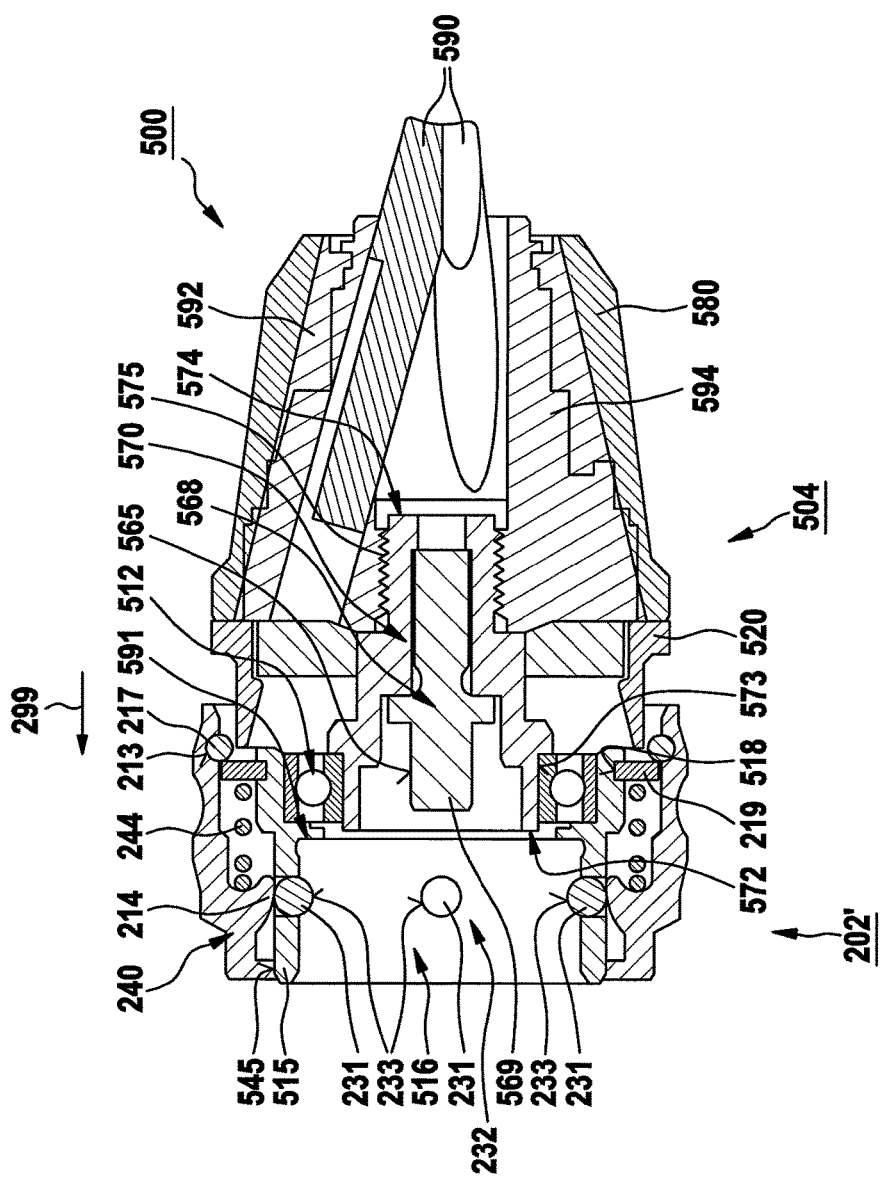
FIG. 5 shows a sectional view of a tool attachment according to a second specific embodiment.

FIG. 5 shows a tool attachment 500 which is likewise provided for mounting on mounting interface 150 of hand-held machine tool 100 of FIG. 1, and which according to a second specific embodiment, is implemented in the manner of a drill-chuck adapter and, for example, has a locking section 202' as well as a clamping-chuck section 504. To simplify the description, tool attachment 500 is therefore also denoted hereinafter as "drill-chuck attachment 500."

By way of example, clamping-chuck section 504 has a supporting member 594, on which a plurality of clamping jaws 590 are supported, which is able to be actuated via a clamping member 592, provided with a clamping sleeve 580, in order to clamp an assigned insert tool, e.g., a round drill. For example, supporting member 594 is fastened, in a manner protected against twisting, via a screw connection 575 to a first axial end area 574 of an actuating element 570 assigned to locking section 202', so that in response to a rotational motion of actuating element 570, supporting element 594 rotates with it. Alternatively, supporting member 594 may also be joined to actuating element 570 by a press-fit connection, for example, or perhaps may be formed in one piece with it. Illustratively, a drive shaft 568 is accommodated in a manner protected against twisting in at least sectionally sleeve-shaped actuating element 570, so that in response to a rotational motion of drive shaft 568, actuating element 570 rotates with it. Alternatively, drive shaft 568 and actuating element 570 may also be formed in one piece.

A multi-edge entrainment contour 565 is formed at a free axial end 569 of drive shaft 568, which, as an example, is accommodated in a second axial end area 572 of actuating element 570. A periphery 573 of second axial end area 572 of actuating element 570 is rotationally mounted in a bearing element 512 assigned to locking section 202', e.g., a rolling-contact bearing formed in the manner of a radial bearing, or preferably is pressed into it. However, it is pointed out that a suitable implementation of clamping-chuck section 504 is sufficiently familiar from the related art, so that a detailed description of clamping-chuck section 504 may be omitted here in order to keep the specification concise.

By way of example, locking section 202' has a base member 515 which, illustratively, forms an inner hollow space that is provided with an inner annular shoulder 591 and in which drive shaft 568 engages, bearing element 512 being disposed in the area of annular shoulder 591, for example, and preferably being pressed in or retained there by retaining rings or circlips, for instance. A cover sleeve 520, for example, is disposed in the area between base member 515 and supporting member 594 of clamping-chuck section 504.

As example, base member 515 has an outer circumference 545, on which, illustratively, locking sleeve 240 of FIG. 2, axially displaceable against the spring force of spring element 244, is disposed. This locking sleeve 240 is preloaded by spring element 244 in an axial direction pointing away from drill-chuck attachment 500, i.e., direction 299 of FIG. 1. To that end, spring element 244 is disposed between clamping ring 214 of FIG. 2, formed by locking sleeve 240, for example, and retaining disk 219 located in an annular groove 518 on base member 515.

The further construction of locking section 202' corresponds to the construction of locking section 202 of FIG. 2, so that a detailed description of this further construction may be omitted here for the purpose of keeping the specification concise. Moreover, it is pointed out that the functioning method of locking section 202' corresponds to the functioning method of locking section 202 of FIG. 2, so that a detailed description of this functioning method may also be omitted here, so as to keep the specification brief.

Figure 6:
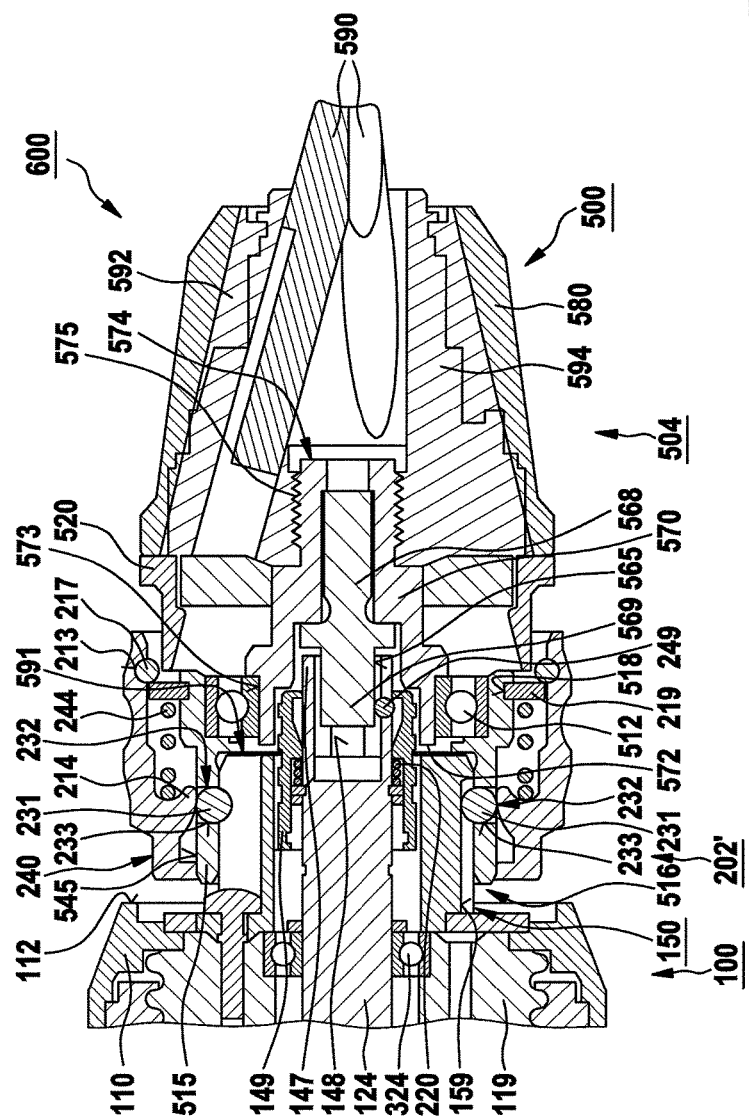
FIG. 6 shows a sectional view of a tool system according to a second specific embodiment having the tool attachment of FIG. 5 mounted on the hand-held machine tool of FIG. 1.

FIG. 6 shows a second specific embodiment of a tool system 600 that, for example, has hand-held machine tool 100 of FIG. 1, illustrated with the aid of the cut-away portion of FIGS. 3 and 4, and drill-chuck attachment 500 of FIG. 5. In this case, tool system 600 is shown in the assembled state. Drill-chuck attachment 500 is mounted on hand-held machine tool 100 analogously to the mounting described above in connection with FIG. 3, using tool system 300 as example, so that for the purpose of keeping the specification concise, a detailed description of the mounting is omitted here.

Figure 7:
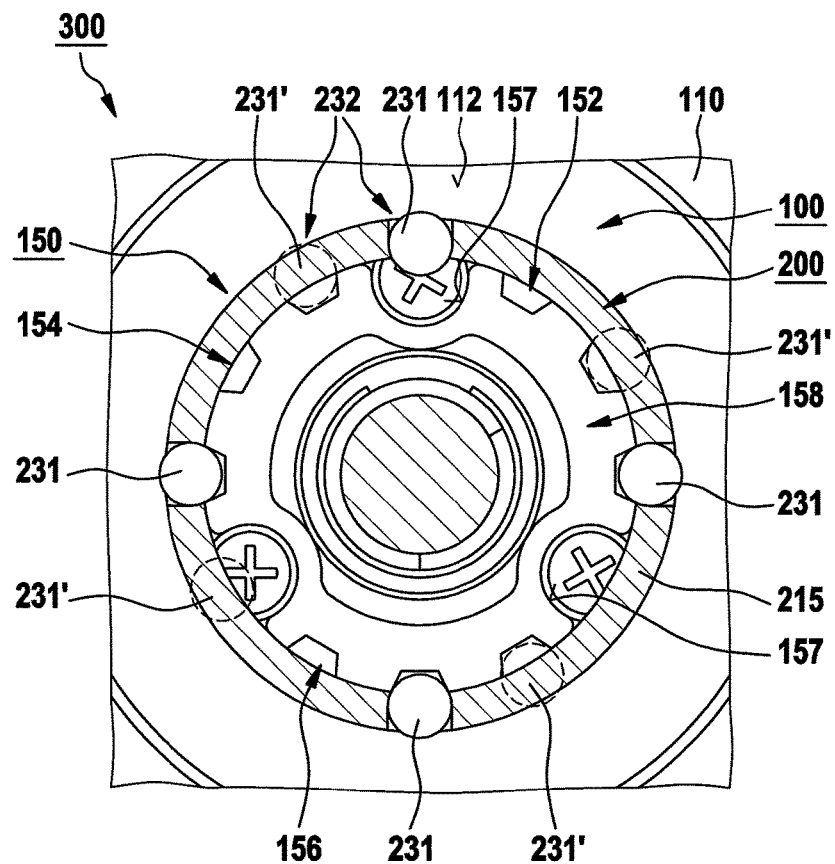
FIG. 7 shows a sectional view of the tool system of FIG. 4, viewed in the direction of arrows VII-VII of FIG. 4.

FIG. 7 shows tool system 300 of FIG. 4 having hand-held machine tool 100 of FIG. 1 and angle attachment 200 of FIG. 2 fastened to its housing 110, in the assembled state, in each case one of locking spheres 231 engaging in one of respective groove-like receivers 152, 154, 156, 157 of mounting interface 150. In this case, for example, angle attachment 200 is oriented in a predefined angular position in which, by way of example, output shaft 205 of FIG. 3 of angle attachment 200 is aligned parallel to the longitudinal direction of hand grip 126 of FIG. 1 of hand-held machine tool 100.

According to one specific embodiment, the predefined angular position may be changed as described in the following, without removing angle attachment 200 from mounting interface 150. To that end, locking sleeve 240 in FIG. 4 is shifted in the direction of arrow 199 into the release position described in connection with FIG. 3, however without an axial shift of angle attachment 200. Due to this shift of locking sleeve 240 into the release position, locking spheres 231 are released and, in response to a twisting of angle attachment 200, are able to slip out of respective groove-like receivers 152, 154, 156, 157, and are transferred into other groove-like receivers 152, 154, 156, 157. If, in the process, locking spheres 231 are transferred into the positions denoted by 231', e.g., by a clockwise twisting of tool attachment 200 in FIG. 7, this corresponds to a twisting of angle attachment 200 by approximately 60°. Angle attachment 200 may subsequently be locked in its new angular position by a release once more of locking sleeve 240 of FIG. 4, as described in connection with FIG. 3.

However, it is pointed out that the change in the predefined angular position was described merely by way of example, with reference to tool system 300 of FIG. 3. In the case of tool system 600 of FIG. 6, the angular position could be changed in analogous manner. However, because of its axial symmetry, the angular position of drill-chuck attachment 500 is irrelevant in the operation of tool system 600 of FIG. 6. Thus, a multitude of angular positions indeed result, in which drill-chuck attachment 500 in tool system 600 of FIG. 6 is able to be joined to hand-held machine tool 100 of FIG. 1 given a corresponding assembly, so that rapid and simple mounting is possible, regardless of a specific angular position.

Figure 8:
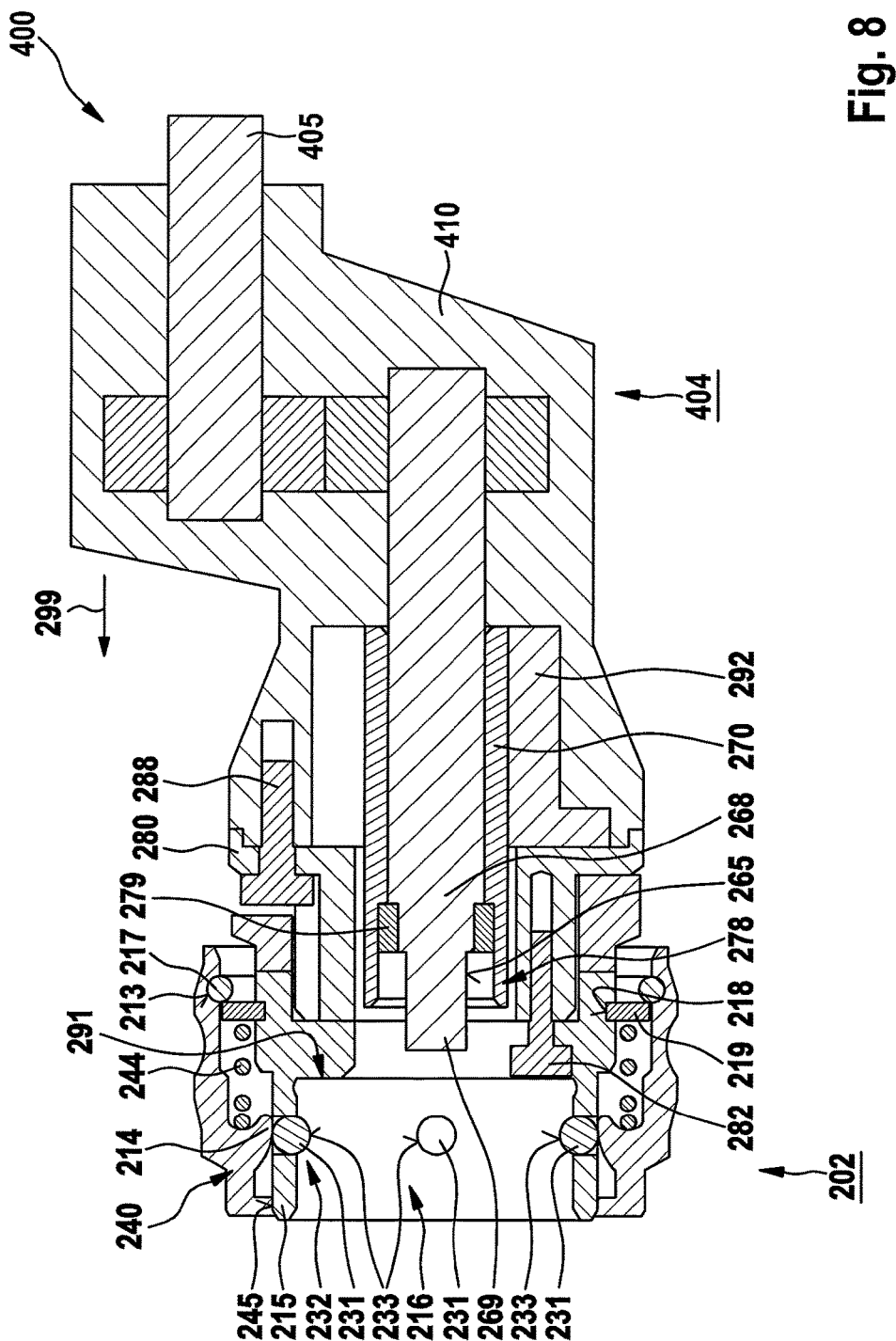
FIG. 8 shows a sectional view of a tool attachment according to a third specific embodiment.

FIG. 8 shows an exemplary tool attachment 400 which, according to one specific embodiment, is designed for mounting on mounting interface 150 of hand-held machine tool 100 of FIG. 1. According to a third specific embodiment, tool attachment 400 is implemented in the manner of an eccentric attachment and, for instance, has a locking section 202 as well as a drive unit 404, also denoted hereinafter as "eccentric drive section." To simplify the description, tool attachment 400 is also denoted hereinafter as "eccentric attachment 400."

For example, eccentric drive section 404 has an attachment housing 410, in which a rotationally impellable drive shaft 268 of eccentric attachment 400 is rotationally mounted. Drive shaft 268 is used to drive an output shaft 405, which is rotationally mounted in attachment housing 410, in parallel and at a predefined distance from drive shaft 268. The free end of output shaft 405 may be formed, for example, to receive screwdriver bit 170 of FIG. 1. However, it is stressed that a suitable implementation of eccentric drive section 404 is sufficiently familiar from the related art, so that a detailed description of eccentric drive section 404 may be omitted here in order to keep the specification concise.

For the description of locking section 202 of eccentric attachment 400, reference is made to the description in connection with FIG. 2.

Figure 9:
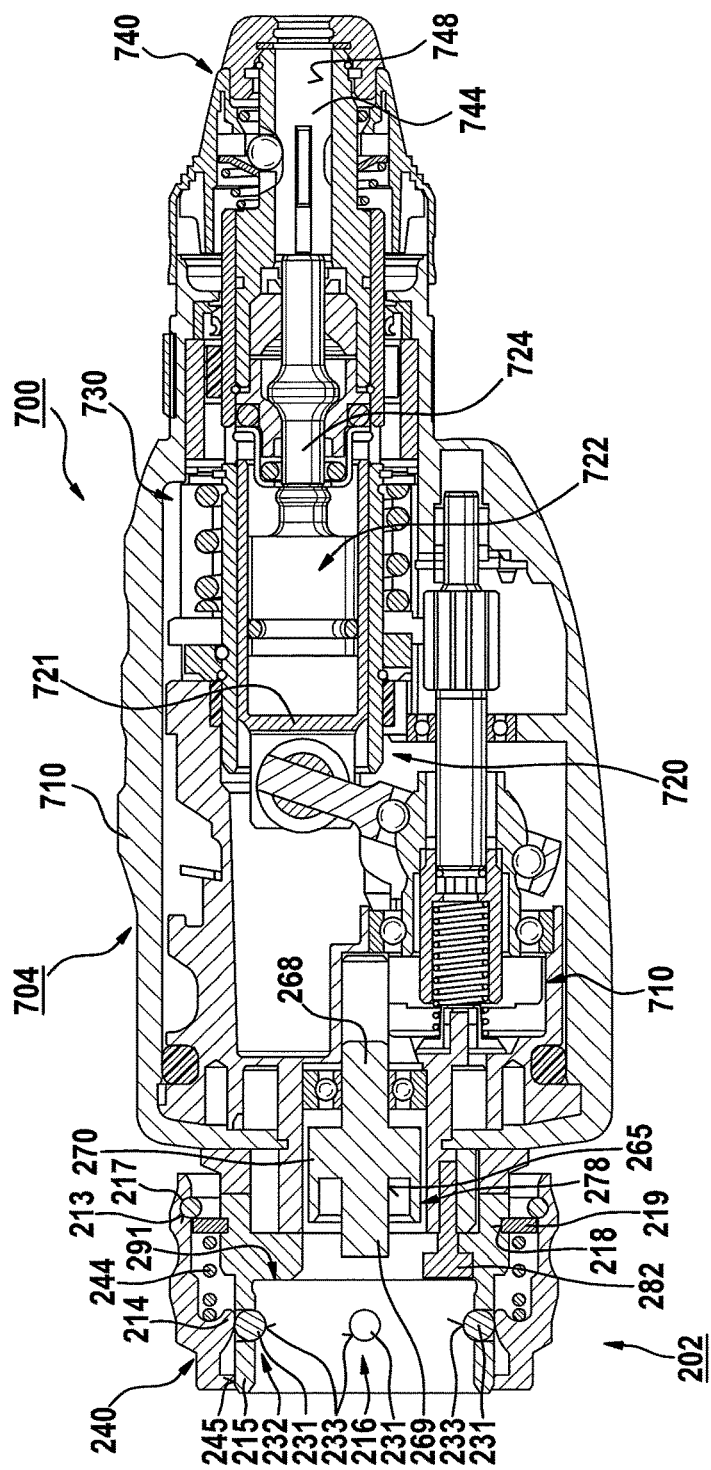
FIG. 9 shows a sectional view of a tool attachment according to a fourth specific embodiment.

FIG. 9 shows an exemplary tool attachment 700 which, according to one specific embodiment, is designed for mounting on mounting interface 150 of hand-held machine tool 100 of FIG. 1. According to a fourth specific embodiment, tool attachment 700 is implemented in the manner of a hammer-blow attachment and, for instance, has a locking section 202 as well as a drive unit 704, also denoted hereinafter as "striking-mechanism drive section." To simplify the description, tool attachment 700 is also denoted hereinafter as "hammer-blow attachment 700."

For example, striking-mechanism drive section 704 has an attachment housing 710, in which a rotationally impellable drive shaft 268 of hammer-blow attachment 700 is rotationally mounted. In addition, a tool holder 740, provided with an output element 744, is provided for receiving an insert tool, (e.g., insert tool 170 of FIG. 1). Output element 744 is formed, illustratively, according to a type of detent sleeve or a tool support and is provided with an inner receiver 748. According to one specific embodiment, it is designed to receive SDS-plus and/or SDS-quick insert tools. Moreover or alternatively, inner receiver 748 may also be designed to receive parallel or straight-shank insert tools and/or Hex insert tools.

Preferably, drive shaft 268 is provided for the rotational actuation of output element 744 as well as for the actuation of a hammer-blow mechanism 720 which is disposed in attachment housing 710 and which is designed to act upon an insert tool (e.g., insert tool 170 of FIG. 1), located in tool holder 740, with blows executed in the axial direction of tool holder 740 during operation of tool attachment 700. Hammer-blow mechanism 720 is designed in particular to generate an impact force necessary especially for boring in hard rock or concrete. According to a first specific embodiment, hammer-blow mechanism 720 is implemented in the manner of a pneumatic striking mechanism and has a striker 722 which, during operation of tool attachment 700, is driven by a piston 721 so as to strike against a striking pin 724 that is connected to output element 744. Piston 721 is driven at least indirectly by a gear unit. In the case of hammer-blow mechanism 720 implemented in the manner of a pneumatic striking mechanism, air acts as spring between piston 721 and striker 722. By way of example, striking mechanism also has an overload coupling.

However, it is pointed out that the construction and functioning method of a pneumatic striking mechanism is sufficiently familiar to one skilled in the art. For example, the pneumatic striking mechanism may be in the nature of a pneumatic striking mechanism customary in hammer drills. Therefore, to keep the specification succinct, a detailed description of the pneumatic striking mechanism is omitted here.

According to a second specific embodiment (not shown), the hammer-blow mechanism is realized in the manner of a mechanical striking mechanism and has a striker which, during operation of the tool attachment, is actuated by a moving spring causing it to strike against a striking pin that is connected to the output element. The moving spring is driven at least indirectly by the gear unit. However, it is pointed out that the construction and functioning method of the mechanical striking mechanism is likewise sufficiently familiar to one skilled in the art. For example, the mechanical striking mechanism may be implemented in the manner of a mechanical striking mechanism customary in hammer drills. Therefore, to keep the specification succinct, a detailed description of the mechanical striking mechanism is also omitted here.

For the description of locking section 202 of hammer-blow attachment 700, reference is made to the description in connection with FIG. 2.

Figure 10:
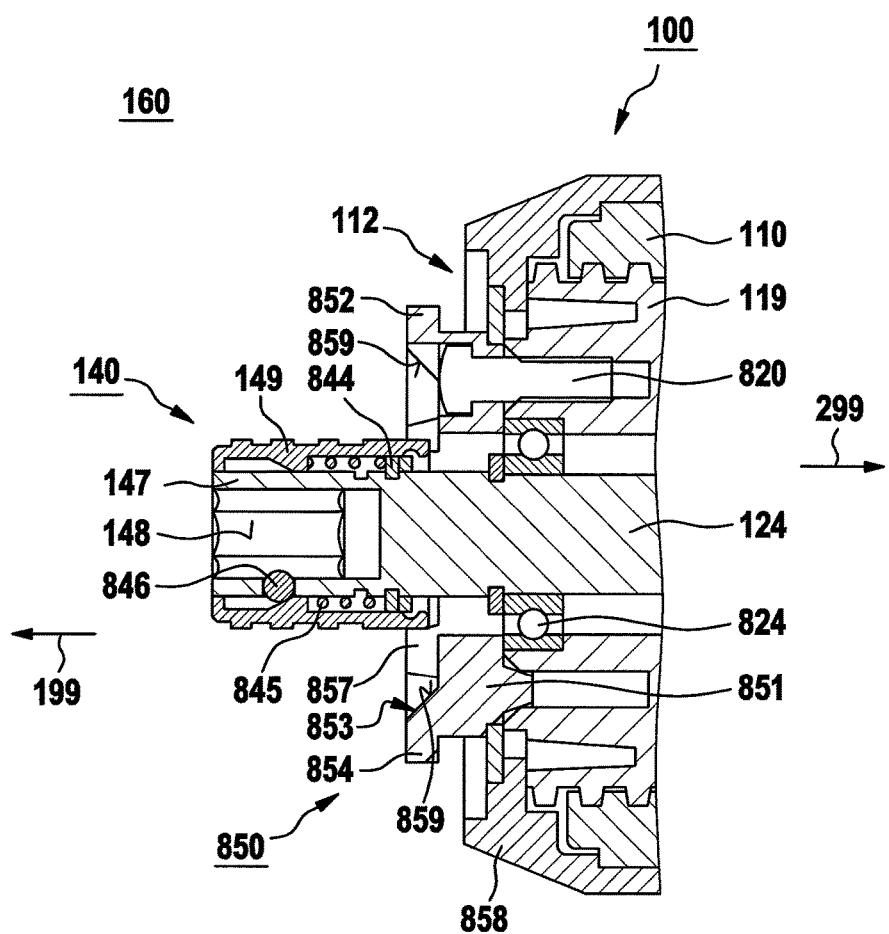
FIG. 10 shows a sectional view of a cut-away portion of the hand-held machine tool of FIG. 1 having a mounting interface according to an alternative specific embodiment.

FIG. 10 shows section 160 of hand-held machine tool 100 of FIG. 1 in a sectional view, having bit holder 140 as well as a mounting interface 850, likewise denoted hereinafter as "machine interface", according to an alternative specific embodiment. As described in connection with FIG. 1, bit holder 140 is formed in the area of end face 112 of housing 110 on output shaft 124 of FIG. 1, which, for example, is rotationally mounted in a bearing element 824, e.g., a rolling-contact bearing, situated in housing 110, preferably in gear housing 119, of hand-held machine tool 100.

Bit holder 140 has receiving member 147 having inner multi-edge receiver 148 and locking sleeve 149 of FIG. 1. For example, locking sleeve 149 is used to act radially on at least one locking element 846, e.g., a locking sphere, and is spring-loaded by an assigned spring element 845, which is braced against a retaining ring 844 held on output shaft 124, in axial direction 199 of FIG. 10 pointing away from hand-held machine tool 100. To release tool holder 140, locking sleeve 149 must be shifted against a spring force, applied by spring element 845, in the direction of end face 112, thus permitting a movement of the at least one locking sphere 846 directed radially outwards.

As illustration, machine interface 850 is secured in axially and radially immovable fashion in the area of bit holder 140 on gear housing 119 or directly on housing 110 and, by way of example, is formed as a separate component, but alternatively, may also be formed in one piece with gear housing 119 or housing 110. Preferably, machine interface 850 is used to secure an assigned tool attachment, e.g., a drill-chuck attachment 950 (see FIG. 11), an angle attachment 200 (see FIG. 12), an eccentric attachment (see FIG. 13) or a hammer-blow attachment 1600 (see FIG. 14), etc., in a manner protected against twisting, and illustratively, has a mounting element 851 secured at end face 112 of housing 110 on gear housing 119 or housing 110 in a manner protected against twisting by fastening components 820 in the nature of screws, for example. For instance, mounting element 851 is at least sectionally sleeve-like or ring-shaped, and is secured in the area of a terminal or protective sleeve 858, disposed annularly at end face 112 on housing 110, using suitable fastening components, e.g., screws or rivets, but as an alternative, may also be formed in one piece with gear housing 119 or housing 110. Preferably, mounting element 851 jackets bit holder 140 at least sectionally with a predefined radial clearance in order to permit an axial shift of locking sleeve 149 of bit holder 140 in the interior of mounting element 851.

As illustration, at its outer circumference, mounting element 851 has at least one, and illustratively, two holding elements 852, 854, which are formed in the manner of bayonets in order to form a bayonet joint. However, it is pointed out that the description of such a bayonet joint has only an exemplary character, and does not serve as a restriction of the invention. Rather, alternative fastening possibilities may also be used in the case of machine interface 850, such as what is termed a wire-strap locking or a spherical locking, etc.

Figure 11:
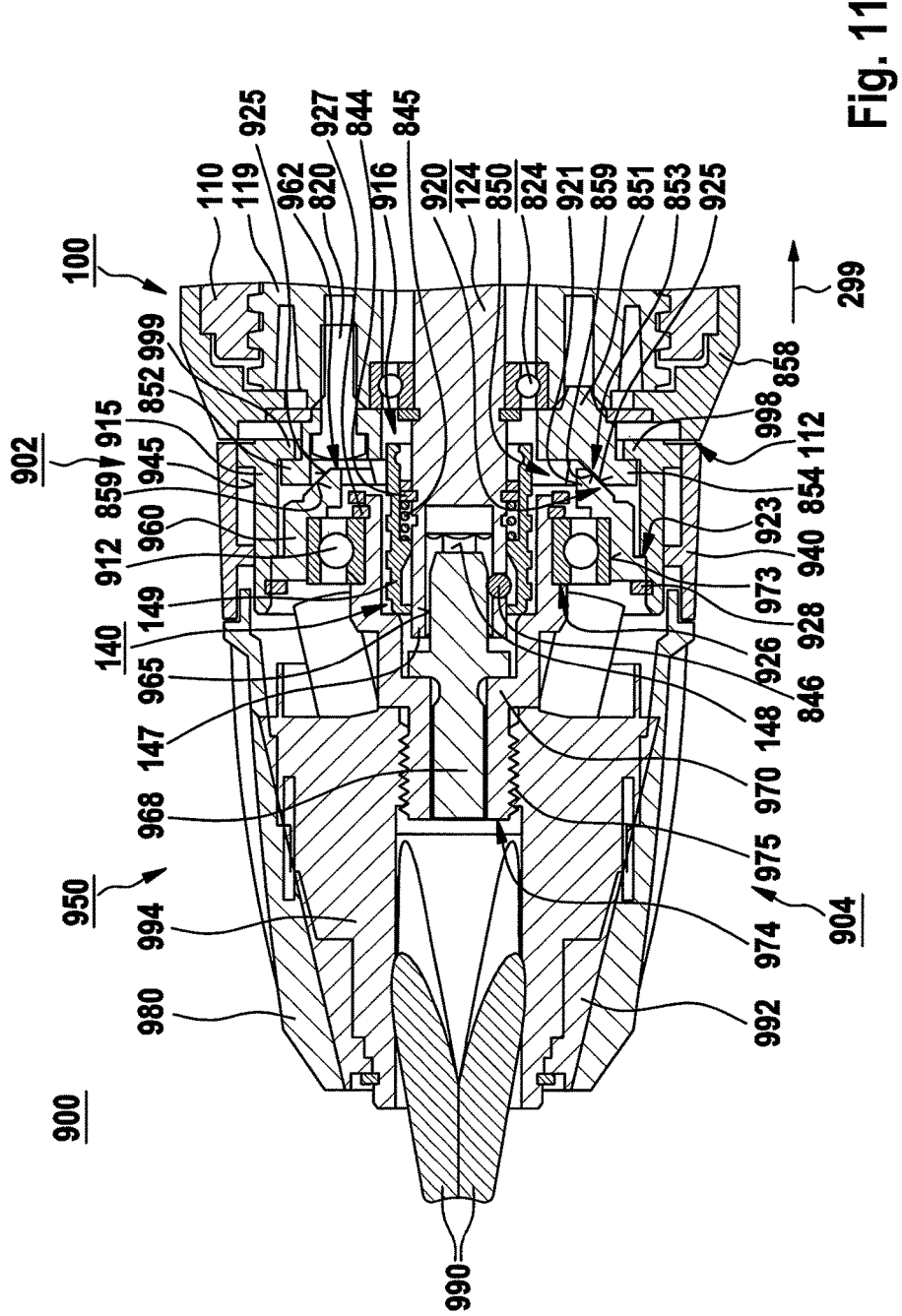
FIG. 11 shows a sectional view of a tool system according to a third specific embodiment having a tool attachment mounted on the mounting interface of FIG. 10.

According to one specific embodiment, at machine interface 850, an at least sectionally conical centering aid 853 is provided for the axial centering of a locking section (902 in FIG. 11) of an assigned tool attachment (950 in FIG. 11). Illustratively, mounting element 851 is designed to permit the axial centering of the assigned tool attachment (950 in FIG. 11) on gear housing 119 and/or housing 110, as described below in connection with FIG. 11. To that end, at the inner circumference of mounting element 851, an exemplary annular, at least sectionally funnel-shaped centering surface 859 is provided for forming centering aid 853.

However, it is stressed that centering surface 859 is formed to be funnel-shaped only by way of example, and not as a restriction of the invention. Rather, a tapered form may also be realized on an additional centering ring. Accordingly, a reference to the term "conical" within the context of the present invention represents a reference both to a tapered and a funnel-shaped embodiment of a corresponding component. Moreover, instead of a single annular and funnel-shaped centering surface 859, centering aid 853 may have a plurality of conical curved sections, etc.

In addition, mounting element 851 has at least one and, exemplarily, three optional angle-adjustment components 857. For instance, they are used for setting a predefined angular position when mounting the tool attachment, e.g., drill-chuck attachment 950 in FIG. 11, on machine interface 850.

FIG. 11 shows an exemplary tool system 900 which, illustratively, has hand-held machine tool 100 of FIG. 1 and an exemplary tool attachment 950. In this case, hand-held machine tool 100 is shown only sectionally with the aid of the section of gear housing 119 or of housing 110 of FIG. 10, at whose end face 112 machine interface 850 of FIG. 10 is disposed, and in which output shaft 124 is rotationally mounted in illustrative rolling-contact bearing 824 of FIG. 10, tool holder 140 of FIG. 10 being disposed on output shaft 124.

According to one specific embodiment, tool attachment 950 is designed for mounting on machine interface 850 of hand-held machine tool 100 in a manner protected against twisting. Preferably, tool attachment 950 takes the form of a drill-chuck attachment, and therefore is also denoted hereinafter as "drill-chuck attachment 950." However, it is pointed out that tool attachment 950 is formed as a drill-chuck attachment only by way of example, and not to restrict the invention. Rather, tool attachment 950 may have any form as desired, e.g., a type of angle attachment (FIG. 12), eccentric attachment (FIG. 13), hammer-blow attachment (FIG. 14), etc., which, as described above, are likewise able to be mounted on machine interface 850 of hand-held machine tool 100 in a manner protected against twisting.

By way of example, drill-chuck attachment 950 has a locking section 902 as well as a clamping-chuck unit 904. Clamping-chuck unit 904 has a supporting member 994, for example, on which a plurality of clamping jaws 990 are supported, which is able to be actuated via a clamping member 992, provided with a clamping sleeve 980, in order to clamp an assigned insert tool, e.g., a round drill. For example, supporting member 994 is fastened, in a manner protected against twisting, via a screw connection 975 to a first axial end area 974 of an actuating element 970 assigned to locking section 902, so that in response to a rotational motion of actuating element 970, supporting member 994 rotates with it. Alternatively, supporting member 994 may also be joined to actuating element 970 by a press-fit connection, or perhaps be formed in one piece with it. Illustratively, a drive shaft 968 is accommodated in a manner protected against twisting in at least sectionally sleeve-shaped actuating element 970, so that in response to a rotational motion of drive shaft 968, actuating element 970 rotates with it. Alternatively, drive shaft 968 and actuating element 970 may also be formed in one piece.

A multi-edge entrainment contour 965 is formed at a free axial end of drive shaft 968, the free axial end exemplarily being accommodated in a second axial end area of actuating element 970. A periphery of the second axial end area of actuating element 970 is rotationally mounted in a bearing element 912 assigned to locking section 902, e.g., in a rolling-contact bearing formed in the manner of a radial bearing, or preferably is pressed into it, so that clamping-chuck unit 904 is rotationally mounted on locking section 902. In this context, bearing element 912 is fixed axially in position in the axial direction of actuating element 970 between an annular shoulder 926 formed on it and a retaining ring 927 secured to it. However, it is pointed out that a suitable implementation of clamping-chuck unit 904 is sufficiently familiar from the related art, so that a detailed description of clamping-chuck unit 904 may be omitted here in order to keep the specification concise.

Locking section 902 is designed for mounting and locking on machine interface 850 of hand-held machine tool 100 in a manner protected against twisting and, for example, has a base member 915, at whose outer circumference at least two holding elements 998, 999 are provided which, for instance, are formed in the manner of bayonets in order to produce a bayonet joint with bayonets 852, 854 of machine interface 850. Base member 915 forms an interior space 916 and has an outer circumference 945 at which, illustratively, an actuating and locking sleeve 940 is disposed. Moreover, base member 915 illustratively has an inner annular shoulder 923 and an inner retaining ring 928 secured to its inner circumference, a centering element 960, for example, being fixed axially in position in the area between annular shoulder 923 and retaining ring 928. Alternatively, this centering element 960 may also be formed in one piece with base member 915, or integrally molded on it. For example, bearing element 912 is disposed and preferably pressed in at inner circumference 973 of centering element 960.

According to one specific embodiment, complementary geometrical shapes are provided on locking section 902 and machine interface 850 of hand-held machine tool 100, the shapes being designed to mesh in order to axially center locking section 902 on machine interface 850. These complementary geometrical shapes are configured to produce a form-locking connection in the axial direction of locking section 902. Therefore, complementary geometrical shapes within the context of the present invention are to be understood quite generally as geometrical shapes which are able to be joined together to produce a form-locking connection.

Illustratively, centering element 960 of locking section 902 has at least one centering aid 920 which is at least sectionally conical. It is provided to engage with at least sectionally funnel-shaped centering aid 853, provided on machine interface 850 of hand-held machine tool 100, and preferably is formed at least sectionally in the manner of a ring 921 having an outer circumference 925, beveled at least in some areas, at an axial end area 962 of locking section 902. Alternatively, instead of ring 921, for example, centering aid 920 may have a plurality of conical curved sections, etc.

In order to mount drill-chuck attachment 950 on machine interface 850 of hand-held machine tool 100, drill-chuck attachment 950 is brought in direction 299 of FIG. 10 toward machine interface 850 and positioned on it in such a way that actuating element 970 is brought into contact with locking sleeve 149 of tool holder 140 of hand-held machine tool 100, so that the free end of drive shaft 968 engages at least sectionally in empty inner multi-edge receiver 148 of tool holder 140, and is prevented from a complete engagement by the at least one locking sphere 846 of FIG. 10. This locking sphere 846, or other suitable locking elements, are acted upon radially inwards by locking sleeve 149 of tool holder 140 in a manner familiar to one skilled in the art, for example, to thus prevent an unhindered insertion of drive shaft 968 into inner multi-edge receiver 148.

In a further step, drill-chuck attachment 950 is now slid in direction 299 onto machine interface 850, e.g., until base member 915 abuts against mounting element 851 of machine interface 850, so that by rotating actuating and locking sleeve 940, bayonets 998, 999 provided on base member 915 are able to be brought into engagement with bayonets 852, 854 of mounting element 851, and thus locked on them, so that locking section 902 is detachably secured and locked on machine interface 850.

Moreover, in the process, at least sectionally conical centering aid 920 of locking section 902 is brought into contact with at least sectionally funnel-shaped centering aid 853 of machine interface 850. Thus, a secure and reliable axial centering of drill-chuck attachment 950 on machine interface 850 of hand-held machine tool 100 may be rendered possible.

However, it is pointed out again that centering aids 920 and 853 are conical only by way of example and not to restrict the invention. Rather, as described above, they only have to have complementary geometrical shapes suitable for producing a form-locking connection. Accordingly, centering aid 853 of machine interface 850 may be funnel-shaped, for instance, as shown in FIGS. 10 and 11, while centering aid 920 of drill-chuck attachment 950 is cylindrical or ring-shaped, for example. Alternatively, as described above, centering aid 920 of drill-chuck attachment 950 may be conical, i.e., tapered or funnel-shaped, for example, while centering aid 853 of machine interface 850 is cylindrical or ring-shaped, etc.

Figure 12:
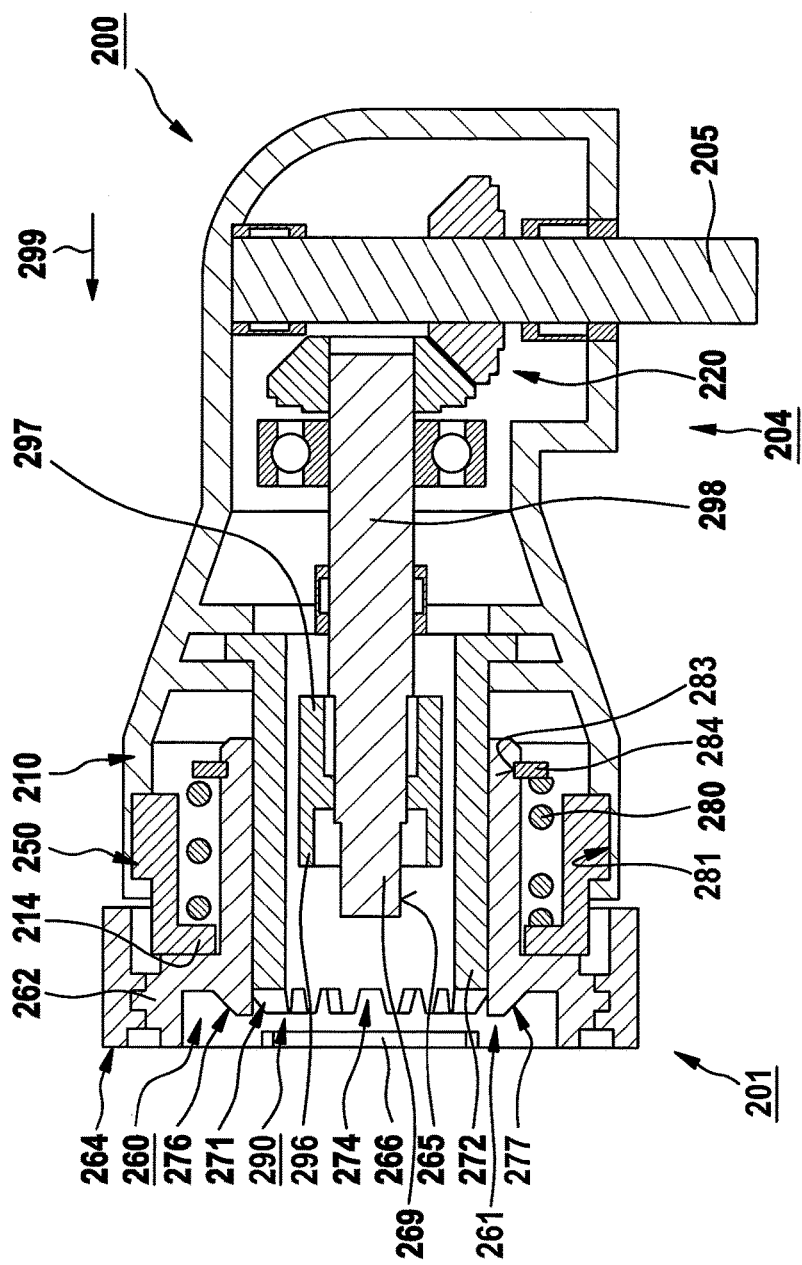
FIG. 12 shows a sectional view of a tool attachment according to a further specific embodiment.

FIG. 12 shows an exemplary tool attachment 200 which, according to one specific embodiment, is designed for detachable mounting on machine interface 850 of hand-held machine tool 100 of FIG. 10. Like tool attachment 200 according to FIG. 2, tool attachment 200 is implemented in the manner of an angle attachment and, by way of example, has an alternative locking section 201, denoted hereinafter as "attachment interface" for the purpose of clarifying the description. Locking section 201 is used as mounting interface on tool attachment 200. Tool attachment 200 likewise has a drive unit 204, also denoted hereinafter as "angle drive section." Mounting interface 201 is designed to connect tool attachment 200 detachably to machine interface 850. Mounting interface 201 is constructed analogously to locking section 902 of drill-chuck attachment 950 according to FIG. 11, and is used as an alternative construction to mounting interface 202 according to FIG. 2.

For example, angle drive section 204 has an attachment housing 210, in which a rotationally impellable drive shaft 298 is rotationally mounted. Drive shaft 298 is used to drive an output shaft 205, which is disposed at a predefined angle, illustratively 90°, relative to drive shaft 298, and likewise is rotationally mounted in attachment housing 210 and, for example, may be designed to receive screwdriver bit 170 of FIG. 1. In this case, drive shaft 298 impels output shaft 205, e.g., via a suitable conversion 220. As described before in connection with FIG. 2, it is pointed out that a suitable implementation of angle drive section 204 is sufficiently familiar from the related art, so that a detailed description of angle drive section 204 may be omitted here in order to keep the specification concise.

In the area of a free end 269 of drive shaft 298 which faces away from angle drive section 204 and on which, for example, a multi-edge entrainment contour 265 is formed, an angle-adjustment element 272 is disposed, which is sleeve-like or tubular at least in some areas and through which drive shaft 298 reaches. This angle-adjustment element 272 is preferably joined rigidly, i.e., axially and radially immovably, to attachment housing 210 and/or is formed in one piece with it. At its other axial end 271, a front-side angle-adjustment serration 274 is provided. Angle-adjustment serration 274 interacts with angle-adjustment components 857 of mounting interface 850 of hand-held machine tool 100.

Moreover, drive shaft 298 is assigned an actuating element 297 which embraces drive shaft 298 in sleeve-like manner at least sectionally. Alternatively, drive shaft 298 and actuating element 297 may also be formed in one piece. For example, actuating element 297 is disposed in the interior of angle-adjustment element 272, and preferably is set apart radially from it. Actuating element 297 has a free end 296. Actuating element 297 assumes the same function as actuating element 970 according to FIG. 11. Upon placing angle attachment 200 on mounting interface 850, free end 296 acts on locking sleeve 149.

Illustratively, attachment interface 201 has an angular-position adjustment unit 290, to which angle-adjustment element 272 is assigned, as well as a locking unit 260. Locking unit 260 is designed, in a locking state, to lock tool attachment 200 in a predefined angular position on hand-held machine tool 100 for operation on it, and in a release state, to permit the removal of tool attachment 200 from the hand-held machine tool. Angular-position adjustment unit 290 is designed to permit a setting of the predefined angular position of tool attachment 200 for operation on the hand-held machine tool. In this context, according to one specific embodiment, angular-position adjustment unit 290 is able to be actuated in the locking state of locking unit 260 in order to permit a change in the predefined angular position. Preferably, such an actuation to change the predefined angular position is accomplished by a combined longitudinal movement and rotational movement of attachment housing 210. According to an alternative specific embodiment (not shown) of the angular-position adjustment unit, the predefined angular position is changed in the release state of the locking unit. This is accomplished by unlatching the locking unit, releasing the tool attachment from the hand-held machine tool and placing the tool attachment in a different angular position relative to the hand-held machine tool.

According to one specific embodiment, locking unit 260 has a base member 262. Angle-adjustment element 272 is supported in base member 262 in a manner allowing longitudinal and rotational movement. Disposed on base member 262 is a centering element 261 which, for example, has at least two arched centering surfaces 276, 277 beveled or sloped in the longitudinal direction of tool attachment 200, i.e., in direction 299. However, it is stressed that centering element 261 has the at least two arched, beveled centering surfaces 276, 277 only by way of example, and not to restrict the invention. Rather, centering element 261 may also have a single centering area formed in the manner of a truncated cone. Centering element 261, together with centering surfaces 276, 277, interacts with centering aid 853 and centering surfaces 859 of mounting interface 850 formed on it.

In addition, preferably at least two locking elements 266 are provided on base member 262, of which only one locking element 266 is visible in the sectional view according to FIG. 12. For example, locking elements 266 are formed in the manner of bayonets in order to form a bayonet joint. Locking elements 266, in the form of bayonet locking projections, interact with holding elements 852, 854 of mounting interface 850 of hand-held machine tool 100, and axially secure tool attachment 200 on hand-held machine tool 100.

Furthermore, disposed at the outer circumference of base member 262 is, exemplarily, an actuating ring 264 which is able to be actuated in order to lock base member 262 on the hand-held machine tool; base member 262 and actuating ring 264 may also be formed in one piece. At the periphery of a tubular accommodation section of base member 262, illustratively, a reset sleeve 250 is supported in a manner allowing axial and radial movement. At one axial end, it is supported with an annular collar 214 against an annular shoulder of base member 262, and at its other axial end, engages with an annular groove 281 provided on attachment housing 210. Alternatively, reset sleeve 250 may be integrally molded on attachment housing 210 and/or formed in one piece with it. Moreover, between annular collar 214 and a retaining ring 284 disposed in an outer annular groove 283 of tubular accommodation section 261, a spring element 280, e.g., a pressure spring, is provided which preloads reset sleeve 250 with a predefined spring force in the direction of the annular shoulder of base member 262, i.e., in direction 299. By way of example, annular groove 283 is formed in the area of an axial end of the tubular accommodation section of base member 262 facing angle drive section 204.

Figure 13:
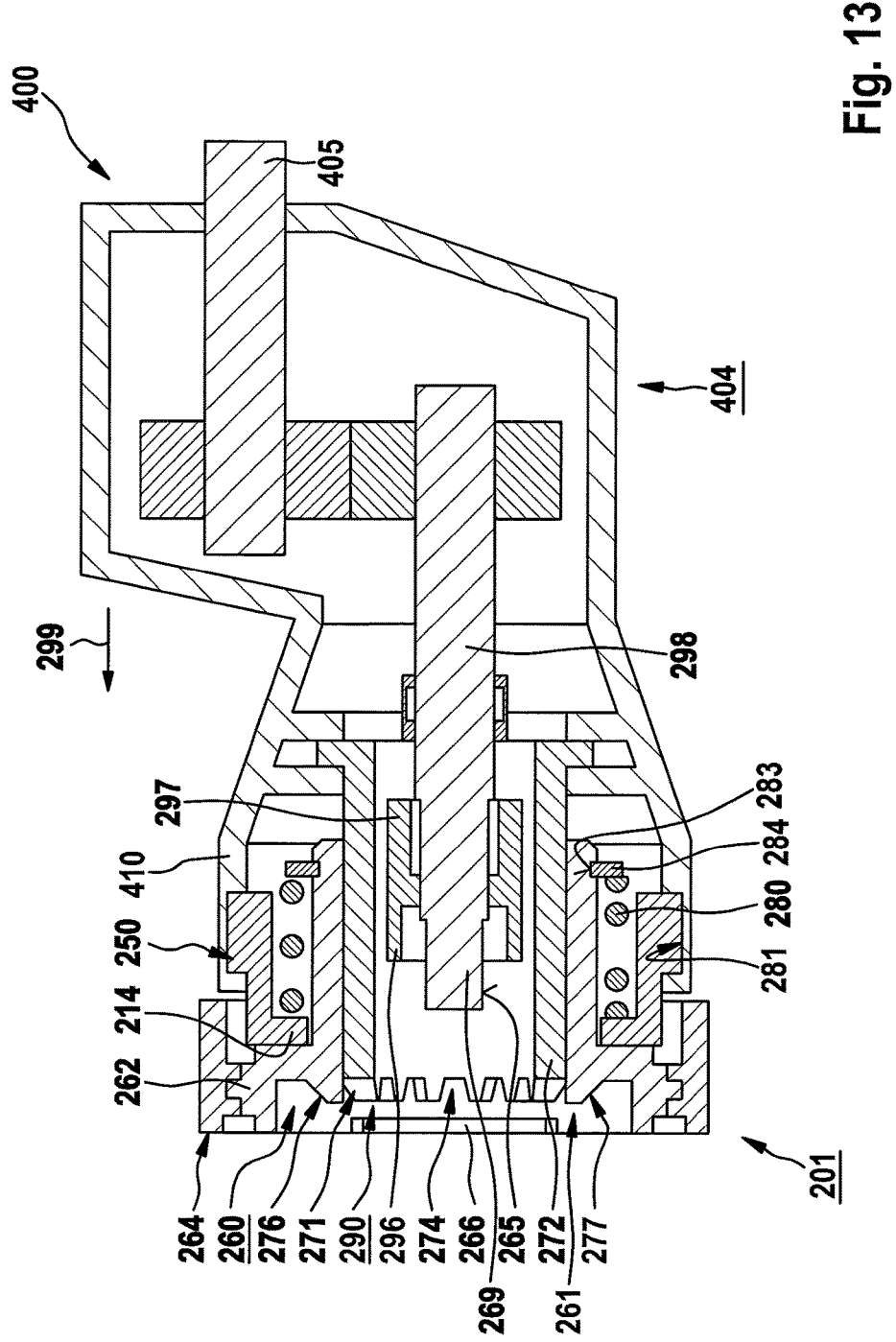
FIG. 13 shows a sectional view of a tool attachment according to a further specific embodiment.

FIG. 13 shows an exemplary tool attachment 400 which, according to one specific embodiment, is designed for detachable mounting on machine interface 850 of hand-held machine tool 100 of FIG. 10. Tool attachment 400 is in the nature of an eccentric attachment and, for example, has a mounting interface 201, denoted hereinafter as "attachment interface" for the purpose of clarifying the description, as well as a drive unit 404 also denoted hereinafter as "eccentric drive section." Mounting interface 201 is constructed like mounting interface 201 of angle attachment 200 according to FIG. 12. Eccentric drive section 404 is constructed like eccentric drive section 404 in FIG. 8. As described before in connection with FIG. 8, it is stressed that a suitable realization of eccentric drive section 404 is sufficiently familiar from the related art, so that a detailed description of eccentric drive section 404 may be omitted here, so as to keep the specification concise.

Figure 14:
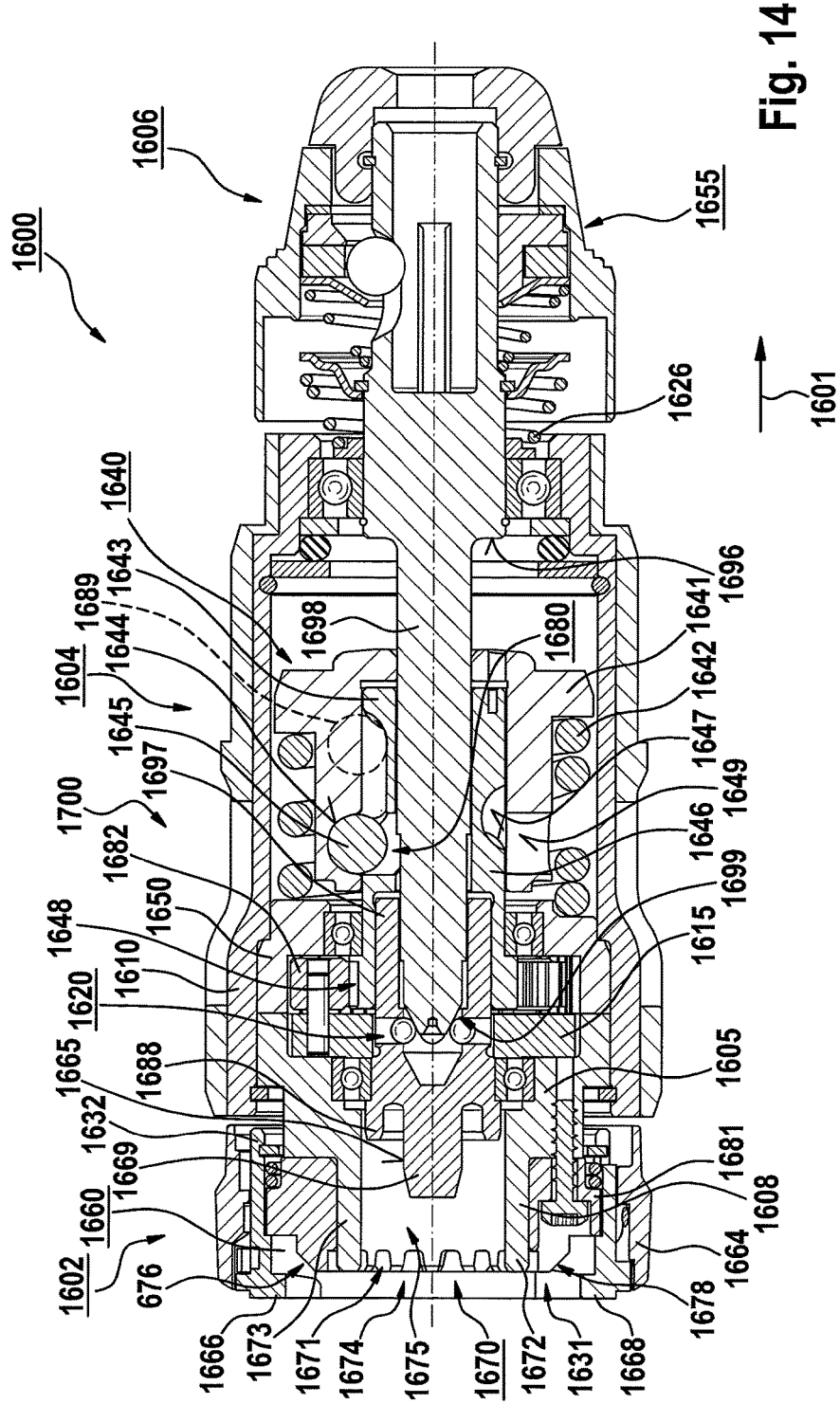
FIG. 14 shows a sectional view of a tool attachment according to a further specific embodiment.

FIG. 14 shows an exemplary tool attachment 1600 which, according to a further specific embodiment, is designed for mounting detachably on machine interface 850 of hand-held machine tool 100 of FIG. 10. Tool attachment 1600 is implemented in the manner of a hammer-blow attachment, and therefore, to simplify the description, is also denoted as "hammer-blow attachment 1600." As example, hammer-blow attachment 1600 has s locking section 1602, denoted hereinafter as "attachment interface" for clarity of the description, as well as a drive unit 1604 also denoted hereinafter as "striking-mechanism drive section." Hammer-blow attachment 1600 represents an alternative specific embodiment of hammer-blow attachment 700 according to FIG. 9.

Locking section 1602 is used as mounting interface on tool attachment 1600. Mounting interface 1602 is constructed analogously to mounting interface 201 of angle attachment 200 according to FIG. 12 and eccentric attachment 400 according to FIG. 13. Illustratively, attachment interface 1602 has an angular-position adjustment unit 1670, to which angle-adjustment element 1672 is assigned, as well as a locking unit 1660.

Disposed at free end 1669 is angle-adjustment element 1672, which is sleeve-like or tubular at least in some areas, and through which driving element 1697 reaches at least sectionally. Angle-adjustment element 1672 has a base member 1673. Base member 1673 is preferably joined rigidly, i.e., axially and radially immovably, to attachment housing 1610 and/or is formed in one piece with it. At its other axial end 1671, a front-side angle-adjustment serration 1674 is provided. Base member 1673 has a sleeve-like section 1608 that forms an accommodation area 1675 in the form of an inner hollow space for receiving tool holder 140 provided with locking element 846 and actuating sleeve 149.

A centering member 1681 is supported in rotationally movable and spring-loaded fashion in base member 1673. This centering member 1681 is secured at an axial end collar 1605 of angle-adjustment element 1672 in a manner protected against twisting. At an axial end of centering member 1681 facing away from drive section 1604, centering member 1681 has at least one centering element 1631 which, for example, has at least two arched centering areas 1676, 1678 beveled or sloped in the longitudinal direction of striking-mechanism attachment 1600, i.e., counter to direction 1601. However, it is stressed that centering element 1631 has the at least two arched, beveled centering surfaces 1676, 1678 only by way of example, and not to restrict the invention.

Locking member 1632 preferably has at least two locking elements 1666, 1668 which, by way of example, are formed in the manner of bayonets to produce a bayonet joint. In addition, disposed at the outer circumference of this locking member 1632 is, exemplarily, an actuating ring 1664 which is able to be actuated in order to lock locking member 1632 on hand-held machine tool 100; locking member 1632 and actuating ring 1664 may also be formed in one piece.

Driving element 1697 has a free end 1669 which faces away from drive section 1604 and on which advantageously a multi-edge entrainment contour 1665, especially a hexagonal entrainment contour, is formed. Multi-edge entrainment contour 1665 is formed in a manner corresponding to multi-edge inner receiver 148 of tool holder 140. Multi-edge entrainment contour 1665 is provided for the purpose of being driven rotationally by multi-edge inner receiver 148 of hand-held machine tool 100. Moreover, driving element 1697 forms an actuating element 1688 which encompasses driving element 1697 in sleeve-like fashion at least sectionally, and which is designed to act upon locking sleeve 149 of FIG. 10.

Hammer-blow attachment 1600 has a tool holder 1606, also denoted hereinafter as "holder section." As illustration, here it has an SDS-plus or SDS-quick holder 1655, but may also have any other holder, e.g., a parallel or straight-shank clamping chuck, etc. Drive unit 1604 has, exemplarily, a striking mechanism 1640 implemented in the manner of a mechanical striking mechanism.

As an example, drive section 1604 has an attachment housing 1610. A rotationally impellable driving element 1697, assigned to striking mechanism 1640, is rotationally mounted in attachment housing 1610. Driving element 1697 is used to drive an output element 1698, e.g., via one at least form-locking connection, output element 1698 likewise being rotationally mounted in attachment housing 1610. A spring element 1626 in the form of a pressure spring preloads holder section 1606, and thus output element 1698, in an axial direction pointing away from attachment housing 1610, as indicated by an arrow 1601.

Striking mechanism 1640 is designed for the direct striking actuation of the output element, i.e., of output spindle 1698 during percussive operation of striking-mechanism attachment 1600, the output element or output spindle 1698 being designed to transmit corresponding striking pulses directly to the insert tool located therein. The output element, i.e., output spindle 1698, includes an impact surface 1696, upon which a striking member 1641 of striking mechanism 1640 strikes during percussive operation. Striking mechanism 1640 has a striking member 1641 which is spring-loaded by a spring element 1642 in the form of a pressure spring and which is coupled to an assigned spring-tensioning component 1646 via a ball guideway 1680. Preferably, striking member 1641 is provided to execute axially-oriented blows, that is, blows in the direction of arrow 1601, against output spindle 1698. By way of example, spring-tensioning component 1646 is sleeve-like, and is accommodated, with its front axial end 1643 facing striking member 1641, in striking member 1641, a spherical tensioning element 1645 being disposed in the area between spring-tensioning component 1646 and striking member 1641. On one hand, this tensioning element 1645 is disposed in a radial recess 1644 of striking member 1641, and on the other hand, is able to roll in a control curve 1647 formed at the inner circumference of spring-tensioning component 1646. Radial recess 1644 of striking member 1641 is formed at its inner circumference and may be created, for example, via a diametrically opposite through-hole 1649 by penetration of a suitable boring tool.

The position of spherical tensioning element 1645 shown in FIG. 14 corresponds, illustratively, to a tensioning position in which spring element 1642 is tensioned to the maximum, so that release of tensioning element 1645 permits an axial blow by striking member 1641 against impact surface 1696 of output spindle 1698. After execution of such a blow, tensioning element 1645 is in a resting position 1689 indicated by a broken line.

At its axial end facing away from striking member 1641, spring-tensioning component 1646 accommodates driving element 1697, spring-tensioning component 1646 being rotationally movable and being disposed on driving element 1697 so as to be rotatable or twistable independently of it. To actuate spring-tensioning component 1646, preferably a speed-transforming gear 1700 is used, which is able to be activated during percussive operation of striking mechanism 1640 and which is implemented here in the manner of a single-stage planetary gear having a planet carrier 1615 able to be driven by driving element 1697, and a plurality of planet wheels 1682. They are coupled in terms of drive engineering to spring-tensioning component 1646 via a rotational entrainment toothing 1648, and are disposed in an assigned internal ring gear 1650. It is situated in attachment housing 1610 so as to be attached to the housing and protected against twisting.

In order to activate the percussive operation of striking mechanism 1640, an engagement clutch 1620 is provided, preferably able to be actuated by an axial shift of output spindle 1698 against the spring force of spring element 1626 acting as idle spring, and counter to the direction of arrow 1601. Engagement clutch 1620 is designed preferably, upon actuation by output spindle 1698—shown in FIG. 14 in an assigned idling position—to permit actuation of spring-tensioning component 1646 by speed-transforming gear 1700 to tension and release spring element 1642 via striking member 1641. In this context, to allow actuation of engagement clutch 1620 by output spindle 1698, output spindle 1698 preferably has a conical axial end 1699 which is disposed in driving element 1697 and is provided to engage with engagement clutch 1620 during percussive operation of striking mechanism 1640.

The functioning method of hammer-blow attachment 1600 as well as further particulars concerning component parts are described in DE 10 2014 205 555.5, the disclosure of which is incorporated explicitly in the present specification, so that a detailed description of them may be omitted here for the purpose of keeping the specification brief. The functioning method of hammer striking mechanism 1640 as well as further particulars concerning component parts of it are described in DE 10 2013 208 882.5, the disclosure of which is incorporated explicitly in the present specification, so that a detailed description of them may be omitted here so as to keep the specification brief.

Figure 15:
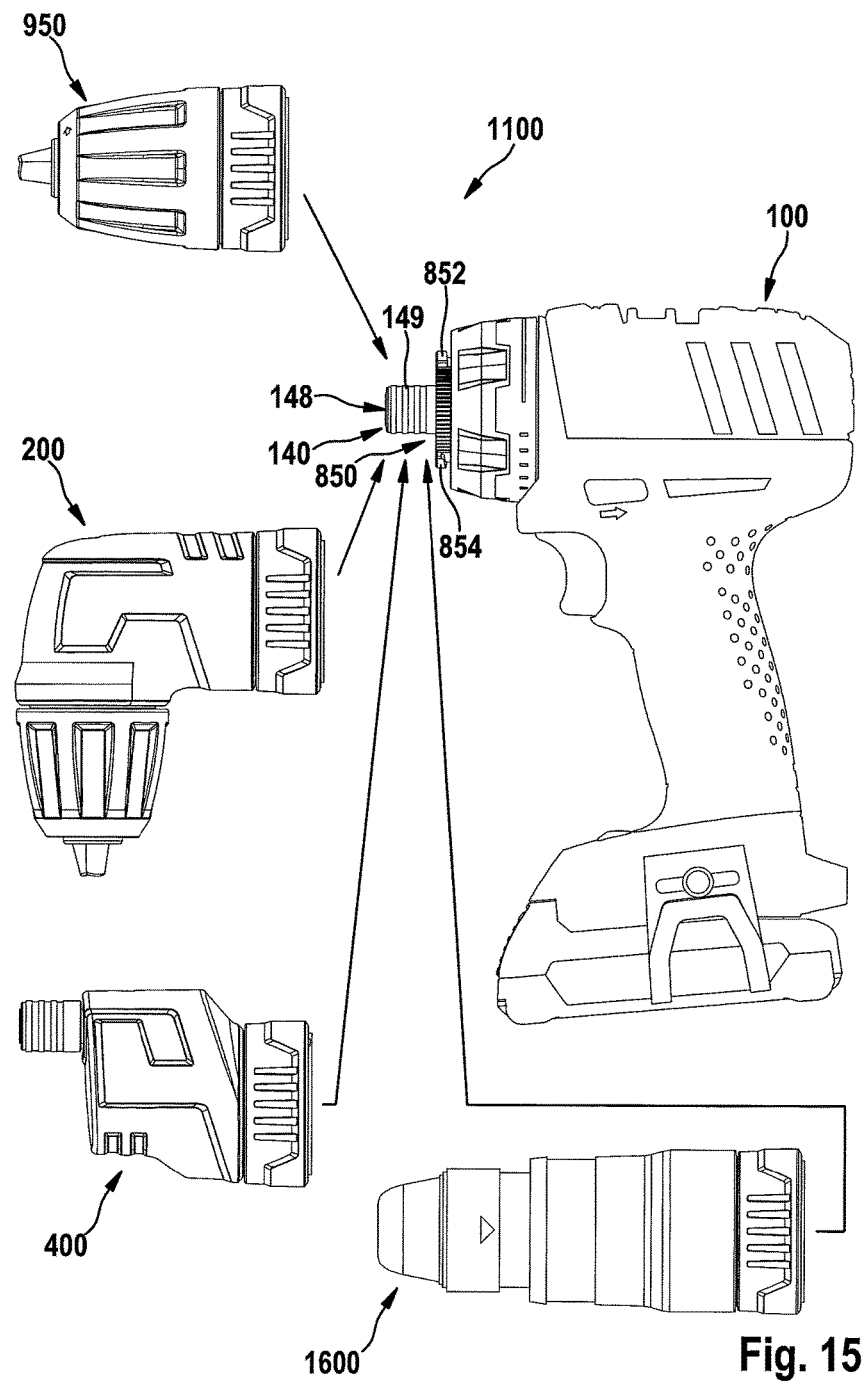
FIG. 15 shows a tool system, including a hand-held machine tool and a plurality of different tool attachments.

FIG. 15 shows a tool system 1100 made up of a hand-held machine tool 100 and several different tool attachments 950, 200, 400, 1600. Hand-held machine tool 100 is preferably a cordless drill/driver. Hand-held machine tool 100 is equipped with a tool holder 140 and a mounting interface 850. Tool holder 140 and mounting interface 850 correspond to tool holder 140 and mounting interface 850 from FIG. 10. As described in connection with FIG. 10, tool holder 140 takes the form of a bit holder and includes receiving member 147 having inner multi-edge receiver 148 and locking sleeve 149. Mounting interface 850 includes holding elements 852, 854 in the form of bayonet projections for the axial securing of the tool attachment on hand-held machine tool 100. Mounting interface 850 also includes angle-adjustment components 857, e.g., in the form of a ring gear, to protect the tool attachment from twisting on hand-held machine tool 100. Mounting interface 850 is designed to releasably secure one of tool attachments 950, 200, 400, 1600 mechanically to hand-held machine tool 100. Tool attachments 950, 200, 400, 1600 may be mounted interchangeably with one another on hand-held machine tool 100. Hand-held machine tool 100 may thus be used selectively with one of tool attachments 950, 200, 400, 1600 or with an insert tool 170 in the form of a screwdriver bit according to FIG. 1. The operator of hand-held machine tool 100 may select one of tool attachments 950, 200, 400, 1600 for mounting on mounting interface 850, depending on the application case. Alternatively, the operator may also use hand-held machine tool 100 without a tool attachment, but with insert tool 170 in tool holder 140. This increases the utilization diversity of one and the same hand-held machine tool 100. Tool attachment 950 is implemented in the manner of a drill-chuck attachment, as described in greater detail in connection with FIG. 11. Tool attachment 200 is implemented in the manner of an angle attachment, as described in greater detail in connection with FIG. 12. Tool attachment 400 is implemented in the manner of an eccentric attachment, as described in greater detail in connection with FIG. 13. Tool attachment 1600 is implemented in the manner of a hammer-blow attachment, as described in greater detail in connection with FIG. 14. Tool system 1100 includes, by way of example, four tool attachments. Alternatively, tool system 1100 may also include fewer than four tool attachments, particularly two or three tool attachments. Furthermore, tool system 1100 may alternatively include additional tool attachments and/or other tool attachments. Regardless of the number of tool attachments, all tool attachments are protected against twisting and are releasably coupled axially to mounting interface 850 of hand-held machine tool 100. For example, a transmission attachment is known from DE 10 2010 002 013 A1, a torque attachment is known from DE 10 2006 057 928 A1 and a cutting attachment is known from DE 10 2009 047 444 A1 as alternative tool attachments. These tool attachments may be provided with an attachment interface, with which the tool attachments are able to be mounted at mounting interface 850 on hand-held machine tool 100.

In an alternative specific embodiment of tool system 1100, hand-held machine tool 100 has an alternative mounting interface. An alternative mounting interface 150 is described, for example, with the aid of FIG. 1. Thus, hand-held machine tool 100 having mounting interface 150 from FIG. 1, as well as angle attachment 200 from FIG. 2, drill-chuck attachment 500 from FIG. 5, eccentric attachment 400 from FIG. 8 and hammer-blow attachment 700 from FIG. 9 form such an alternative tool system.

Mounting interface 150 according to FIG. 1 and mounting interface 850 according to FIG. 10 are each selected by way of example. Mounting interfaces 150, 850 are designed to axially secure, as well as to protect each tool attachment from twisting on a stationary housing component of hand-held machine tool 100, especially tool housing 110 and/or gear housing 119.

Alternative specific embodiments of the mounting interface as well as of the securing elements for the axial securing, and securing elements for protection against twisting are possible. One alternative mounting interface having the suitable securing elements is described, for example, in DE 10 2011 084 495 A1, the disclosure of which is incorporated explicitly in the present specification, so that a detailed description of them may be omitted here in order to keep the specification concise. Further alternative securing elements are likewise possible. Thus, for instance, a tensioning element, e.g., a tensioning lever, may also be used as axial securing element on the tool attachment, which interacts with a circumferential groove on the housing of the hand-held machine tool.

In a further alternative specific embodiment of tool system 1100, tool holder 140 of hand-held machine tool 100 has an alternative locking sleeve to locking sleeve 149, which is preloaded by a spring element in the direction toward hand-held machine tool 100. In the case of such a locking sleeve, the spring force of the spring element thus acts in the direction counter to the direction denoted by 199 in FIGS. 1 and 10. Such a tool holder may be gathered, for example, from DE 10 2014 205 555.5 already mentioned above.

In another alternative specific embodiment of tool system 1100, tool holder 140 of hand-held machine tool 100 has no locking sleeve 149 and no locking sphere 846. Instead, a springy retaining ring, especially a circlip (not shown), is disposed as locking element in receiving member 147 of tool holder 140. Tool holders of this type having a retaining ring for locking an insert tool are familiar from the related art, which is why a more detailed description is omitted, so as to keep the specification brief.

What is claimed is:

1. A tool system, comprising:
   an angle attachment that includes (i) an angle locking section for locking on a mounting interface of a hand-held machine tool and (ii) an angle drive unit;
   an eccentric attachment that includes (i) an eccentric locking section for locking on the mounting interface of the hand-held machine tool and (ii) an eccentric drive unit;
   a hammer-blow attachment that includes (i) a hammer-blow locking section for locking on the mounting interface of the hand-held machine tool and (ii) a striking-mechanism drive unit; and
   the hand-held machine tool including:
      a tool holder for receiving an insert tool; and
      the mounting interface on which the angle attachment is mountable, the eccentric attachment is mountable, and the hammer-blow attachment is mountable, wherein each of the angle attachment, the eccentric attachment, and the hammer-blow attachment is alternately mountable on the mounting interface,
   wherein the tool holder includes:
      a receiving member for receiving the insert tool; and
      a locking sleeve,
   wherein the tool holder has a spring element which preloads the locking sleeve in an axial direction away from the hand-held machine tool, and
   wherein each of the angle attachment and the eccentric attachment and the hammer-blow attachment has an actuating element configured to act upon, when mounting the respective attachment on the hand-held machine tool, the locking sleeve axially in a direction of the hand-held machine tool.

2. The tool system as recited in claim 1, wherein the mounting interface is configured for further mounting thereon a drill-chuck attachment, wherein the drill-chuck attachment includes a drill-chuck locking section for locking on the mounting interface and a clamping-chuck unit.

3. The tool system as recited in claim 1, wherein a drive shaft of each of the angle attachment and the eccentric attachment and the hammer-blow attachment is coupled in a manner fixed against rotation relative to the tool holder for rotating actuation of the respective attachment when the respective attachment is mounted on the hand-held machine tool.

4. The tool system as recited in claim 3, wherein the drive shaft of each of the angle attachment and the eccentric attachment and the hammer-blow attachment has a multi-edge outer contour and the tool holder has a receiving member having a multi-edge inner receiver for receiving the multi-edge outer contour of the drive shaft.

5. The tool system as recited in claim 1, wherein the mounting interface includes:
   first securing elements for axial securing of the angle attachment and the eccentric attachment and the hammer-blow attachment; and
   second securing elements for protecting the angle attachment and the eccentric attachment and the hammer-blow attachment against twisting on the hand-held machine tool.

6. The tool system as recited in claim 1, wherein the mounting interface has receivers shaped as grooves having end areas that taper in a direction away from the hand-held machine tool, wherein the receivers shaped as grooves are configured to protect the angle attachment and the eccentric attachment against twisting and to axially secure the angle attachment and the eccentric attachment on the hand-held machine tool.

7. The tool system as recited in claim 1, wherein the mounting interface includes:
holding elements in the form of bayonet projections for axially securing the angle attachment and the eccentric attachment and the hammer-blow attachment; and
angle-adjustment components for protecting the angle attachment and the eccentric attachment and the hammer-blow attachment against twisting on the hand-held machine tool.

8. The tool system as recited in claim 1, wherein the locking section of each of the angle attachment and the eccentric attachment and the hammer-blow attachment has a plurality of locking elements for axially securing and for protecting the respective attachment against twisting on the hand-held machine tool.

9. The tool system as recited in claim 1, wherein the locking section of each of the angle attachment and the eccentric attachment and the hammer-blow attachment includes:
holding elements in the form of bayonet projections for axially securing the respective attachment; and
angle-adjustment serrations for protecting the respective attachment against twisting on the hand-held machine tool.

10. A tool system, comprising:
an angle attachment that includes (i) an angle locking section for locking on a mounting interface of a hand-held machine tool and (ii) an angle drive unit;
an eccentric attachment that includes (i) an eccentric locking section for locking on the mounting interface of the hand-held machine tool and (ii) an eccentric drive unit;
a hammer-blow attachment that includes (i) a hammer-blow locking section for locking on the mounting interface of the hand-held machine tool and (ii) a striking-mechanism drive unit; and
the hand-held machine tool including:
a tool holder for receiving an insert tool; and
the mounting interface on which the angle attachment is mountable, the eccentric attachment is mountable, and the hammer-blow attachment is mountable, wherein each of the angle attachment, the eccentric attachment, and the hammer-blow attachment is alternately mountable on the mounting interface,
wherein the locking section of each of the angle attachment, the eccentric attachment, and the hammer-blow attachment has a plurality of locking elements for axially securing and for protecting the respective attachment against twisting on the hand-held machine tool,
wherein the plurality of locking elements are in the form of locking spheres.

11. The tool system as recited in claim 10, wherein the tool holder includes:
a receiving member for receiving the insert tool; and
a locking sleeve.

12. The tool system as recited in claim 11, wherein the insert tool has an outer multi-edge coupling and the receiving member has an inner multi-edge receiver for receiving the insert tool.

13. The tool system as recited in claim 11, wherein the tool holder has a spring element which preloads the locking sleeve in an axial direction away from the hand-held machine tool.

14. The tool system as recited in claim 13, wherein each of the angle attachment and the eccentric attachment and the hammer-blow attachment has an actuating element configured to shift, when mounting the respective attachment on the hand-held machine tool, the locking sleeve against a spring force applied by the spring element, in a direction of the hand-held machine tool.

15. The tool system as recited in claim 13, wherein each of the angle attachment and the eccentric attachment has an actuating element configured to act upon, when mounting the respective attachment on the hand-held machine tool, the locking sleeve axially in a direction of the hand-held machine tool.

16. The tool system as recited in claim 14, wherein the actuating element of the angle attachment is assigned to a drive shaft of the angle attachment, and the actuating element of the eccentric attachment is assigned to a drive shaft of the eccentric attachment, and the actuating element of the hammer-blow attachment is assigned to drive a shaft of the hammer-blow attachment.

17. The tool system as recited in claim 16, wherein the actuating element surrounds the drive shaft at least sectionally in sleeve-shaped fashion.

18. The tool system as recited in claim 17, wherein the actuating element is sleeve-shaped and is disposed coaxially relative to the drive shaft.

19. The tool system as recited in claim 18, wherein the actuating element is coupled in a manner fixed against rotation relative to the drive shaft.

20. The tool system as recited in claim 16, wherein the drive shaft and the actuating element are formed in one piece.

* * * * *